United States Patent [19]

Matsuo et al.

[11] Patent Number: 5,710,500
[45] Date of Patent: Jan. 20, 1998

[54] MOTOR SPEED CONTROL APPARATUS USING PHASE-ADVANCE BASED ESTIMATED DISTURBANCE SIGNAL

[75] Inventors: Keisuke Matsuo, Neyagawa; Toshio Inaji, Mino, both of Japan

[73] Assignee: Matsushita Electric Industrial Co., Ltd., Kadoma, Japan

[21] Appl. No.: 429,284

[22] Filed: Apr. 24, 1995

[30] Foreign Application Priority Data

Apr. 28, 1994 [JP] Japan ............................. 6-091412

[51] Int. Cl.⁶ ........................................... G01M 7/00
[52] U.S. Cl. .................. 318/799; 318/802; 318/632; 318/806; 318/432; 364/150; 364/176
[58] Field of Search .......................... 318/561, 606–611, 318/615–622, 798, 799, 802, 806, 632–634, 432–434; 364/148–150, 158, 176, 177; 388/930, 804, 805; 414/676

[56] References Cited

U.S. PATENT DOCUMENTS

| 4,360,767 | 11/1982 | Akiyama et al. | 388/804 |
|---|---|---|---|
| 5,091,684 | 2/1992 | Iwashita | 318/616 |
| 5,349,278 | 9/1994 | Wedeen | 318/632 |
| 5,467,004 | 11/1995 | Matsuo et al. | 318/807 |
| 5,481,417 | 1/1996 | Yokoyama et al. | 360/73.08 |
| 5,511,930 | 4/1996 | Sato et al. | 414/676 |
| 5,525,877 | 6/1996 | Umida | 318/432 |

FOREIGN PATENT DOCUMENTS

| 0599190A2 | 6/1994 | European Pat. Off. . | |
|---|---|---|---|
| 3155383 | 7/1991 | Japan . | |
| 4112690 | 4/1992 | Japan . | |
| 538176 | 2/1993 | Japan . | |
| 5122970 | 5/1993 | Japan . | |
| 5300782 | 11/1993 | Japan . | |
| 8147039 | 6/1996 | Japan . | |

OTHER PUBLICATIONS

IEEE Transactions on Consumer Electronics; Nov. 1, 1992; vol. 38, No. 4, pp. 747–754; "Precision Motor Control System for VCR Using Disturbance and Velocity Observer".

Primary Examiner—Brian Sircus
Attorney, Agent, or Firm—Renner, Otto, Boisselle, Sklar

[57] ABSTRACT

The motor speed control apparatus according to the present invention controls the rotation speed of a motor to be constant in a state where a disturbance torque is present. The motor speed control apparatus includes a disturbance torque observer 1. The disturbance torque observer 1 estimates a disturbance torque $\tau_d$ based on a detected speed signal v detected by a speed detector 105 and a drive signal D supplied to a drive circuit 150, and cuts off high-frequency components thereof by means of filters 13 and 2 so as to output an estimated disturbance signal d. A comparator 130 outputs a speed error signal $\Delta v$, which is a difference between the detected speed signal v and a desired speed signal $v_r$. An arithmetic unit 140 outputs a control signal c in accordance with the speed error signal $\Delta v$. A torque correction unit 3 corrects the control signal c by using the estimated disturbance signal d so as to output the drive signal D. The drive circuit 150 supplies a motor 100 with a drive current $I_a$ which is in accordance with the drive signal D.

16 Claims, 15 Drawing Sheets

MOTOR SPEED CONTROL APPARATUS USING PHASE-ADVANCE BASED ESTIMATED DISTURBANCE SIGNAL

BACKGROUND OF THE INVENTION

1. Field of the Invention

The present invention relates to an apparatus for controlling the speed of a motor (hereinafter referred to as a "motor speed control apparatus"), and particularly to a motor speed control apparatus capable of reducing the influence of disturbance torque.

2. Description of the Related Art

A motor is liable to some fluctuation in the rotation speed thereof due to a disturbance torque applied to the motor. It is essential to reduce this speed fluctuation in order to control the rotation speed of a motor to be constant.

In a conventional motor speed control apparatus (not shown), the influence of a disturbance torque is suppressed by element of a speed control loop. The frequency characteristics taken from the disturbance torque to the speed fluctuation (hereinafter, these characteristics will be referred to as "sensitivity to disturbances" or "disturbance sensitivity") improve as the loop gain of the speed control loop is increased, thereby reducing the speed fluctuation due to the disturbance torque. However, a control system is likely to become unstable if the loop gain becomes too large, so that there has been a limit to the improvement of the disturbance sensitivity.

In recent years, various control methods for greatly reducing the speed fluctuation of a motor due to such disturbance torques have been proposed, the methods employing disturbance torque observers. These control methods feature a configuration where a disturbance suppression loop incorporating a disturbance torque observer is added to a speed control loop for controlling the speed of a motor to be a desired value. Such a control apparatus is described in Japanese Laid-Open Patent Publication No. 3-155383, for example. FIG. 9 is a block diagram showing such a conventional control apparatus.

In FIG. 9, reference numeral 100 represents a motor. The control apparatus for the motor 100 includes control elements such as an arithmetic unit 141 and a drive circuit 151. In addition to the above fundamental elements, the control apparatus includes an disturbance torque observer 200. The disturbance torque observer 200 includes a multiplier 201 for detecting a drive current applied to the motor 100 and multiplying the drive current with a coefficient, multipliers 202 and 203 for detecting a speed of the motor 100 and multiplying the motor speed with a coefficient, a filter 204 having a transfer function defined as $1/(s+g)$, and a multiplier 205. In FIG. 9, J denotes an inertia of the motor 100; s denotes a Laplacian; $K_p$ denotes a proportional gain; $K_i$ denotes an integral gain; $K_{amp}$ denotes a gain of the drive circuit 151; $I_a$ denotes a drive current; $K_r$ denotes a torque constant of the motor 100; $\tau$ denotes a torque generated by the motor; $\omega$ denotes a speed of the motor 100; g denotes a constant that determines a bandwidth of the disturbance torque observer 200; r denotes a desired speed; e denotes an error signal; c denotes a control signal; $\tau_d$ denotes a disturbance torque; $\tau_e$ denotes an estimated disturbance torque; $J_n$ denotes a nominal value of the inertia of the motor 100; and $K_{rn}$ denotes a nominal value of the torque constant of the motor 100.

Hereinafter, an operation of the above-described conventional control apparatus will be described. In the fundamental speed control loop, the speed $\omega$ of the motor 100 is compared against the desired speed r, whereby the error signal e is obtained. The error signal e is proportional/integral-compensated by the arithmetic circuit 141. The arithmetic circuit 141 outputs the control signal c. The control signal c is multiplied by $K_{amp}$ in the drive circuit 151. Moreover, the output of the drive circuit 151 is added with the output of the disturbance torque observer 200, so as to be input to the motor 100 as the drive current $I_a$. The drive current $I_a$ is converted into the torque $\tau$. Thus, the motor 100 is controlled in such a way that the speed $\omega$ of the motor 100 becomes equal to the desired speed r.

Next, an operation of the disturbance torque observer 200 will be described. The multiplier 201 multiplies the drive current $I_a$ by a coefficient $gK_{rn}$. The multipliers 202 and 203 multiply the speed $\omega$ of the motor 100 by coefficients $g_2J_n$ and $gJ_n$, respectively. A sum of the outputs of the multipliers 202 and 203 are input to the filter 204. The estimated disturbance torque $\tau_e$ is obtained by subtracting the output of the multiplier 203 from the output of the filter 204. The estimated disturbance torque $\tau_e$ is multiplied by a coefficient $1/K_{rn}$ in the multiplier 205, and then added with the output of the drive circuit 151, whereby the drive current $I_a$ is obtained. As a result of this addition, the influence of the disturbance torque $\tau_d$, which is applied to the motor 100, is cancelled, thereby suppressing the speed fluctuation of the motor 100.

By using the above-described conventional control apparatus, in a frequency region equal to or below the bandwidth, i.e., g, of the disturbance torque observer 200, the disturbance sensitivity can only be improved at a ratio of $-20$ dB/dec as the frequency decreases. Therefore, when a substantial low frequency component is present among the frequency components of the speed fluctuation of the motor 100, the speed fluctuation occurring due to this low frequency component cannot be sufficiently suppressed.

SUMMARY OF THE INVENTION

A motor speed control apparatus according to the present invention includes: comparison estimation element for receiving a first signal indicating a detected rotation of a motor and a target signal indicating a desired rotation value of the motor, the comparison estimation element outputting an error signal in accordance with a difference between the first signal and the target signal and outputting an estimated disturbance signal indicating a degree of disturbance torque applied to the rotation of the motor; control element for receiving the error signal and outputting a control signal in accordance with the error signal; correction element for receiving the control signal and the estimated disturbance signal and correcting the control signal based on the estimated disturbance signal so as to reduce influence of the disturbance torque on the control signal, the correction element outputting the corrected control signal as a drive signal; and driving element for receiving the drive signal and supplying the motor with electric power in accordance with the drive signal, wherein the comparison estimation element includes second-order low pass filter element and outputs the estimated disturbance signal through the second-order low pass filter element.

In one embodiment of the invention, the comparison estimation element further includes: first coefficient element for multiplying the drive signal by a predetermined coefficient; and second coefficient element for receiving either the first signal or the error signal and processing the received signal based on a predetermined first transfer function.

In another embodiment of the invention, the second-order low pass filter element includes: a first filter for receiving output signals from the first coefficient element and the second coefficient element and filtering the received signals based on a predetermined second transfer function; and a second filter for receiving an output from the first filter and filtering the received signal based on a first-order phase-advancing transfer function so as to output the estimated disturbance signal.

In still another embodiment of the invention, the first filter performs a filtering process for the received signals based on a transfer function $\omega_o/(\alpha s+\omega_o)$, and the second filter performs a filtering process for the received signal based on a transfer function $(a_1 s+\omega_o)/(\beta s+\omega_o)$, wherein s represents a Laplacian; $\omega_o$ represents an angular frequency; $\alpha$ represents a predetermined constant; and $\beta$ represents a predetermined constant.

In still another embodiment of the invention, the second filter further receives an output signal from the second coefficient element.

In still another embodiment of the invention, the coefficient of the first coefficient element is 1.

In still another embodiment of the invention, the first signal is a rotation speed signal indicating a rotation speed of the motor, and the target signal is a target rotation speed signal indicating a target rotation speed of the motor.

In still another embodiment of the invention, the first signal is a rotation speed signal indicating a rotation speed of the motor, and the target signal is a target rotation speed signal indicating a target rotation speed of the motor.

In still another embodiment of the invention, the first signal is a rotation speed signal indicating a rotation speed of the motor, and the target signal is a target rotation speed signal indicating a target rotation speed of the motor.

In still another embodiment of the invention, the first signal is a period signal indicating a rotation period of the motor, and the target signal is a target period signal indicating a target rotation period of the motor.

In still another embodiment of the invention, the second-order low pass filter element has a transfer function defined as $\{1+a_1(s/\omega_o)\}/\{(1+a_1(s/\omega_o)+a_2^2(s/\omega_o)^2\}$, wherein s represents a Laplacian; $\omega_0$ represents an angular frequency; $a_1$ represents a predetermined constant; and $a_2$ represents a predetermined constant.

In still another embodiment of the invention, $a_1$ and $a_2$ satisfy the relationship $a_1 \geq 2a_2$.

In still another embodiment of the invention, $a_1=4$ and $a_2=2$.

In still another embodiment of the invention, the correction element includes multiplication element for multiplying the estimated disturbance signal by a predetermined coefficient and addition element for summing the control signal and an output of the multiplication element so as to output a result of the addition as the drive signal.

In still another embodiment of the invention, the correction element includes addition element for summing the control signal and the estimated disturbance signal so as to output a result of the addition as the drive signal.

In still another embodiment of the invention, the coefficient $\alpha$ of the first filter element, the coefficient $\beta$ of the second filter element, and the constant $a_1$ satisfy the relationship $\alpha+\beta=a_1$.

In still another embodiment of the invention, the coefficient $\alpha$ of the first filter element, the coefficient $\beta$ of the second filter element, and the constant $a_1$ satisfy the relationships $\alpha=\beta=2$ and $a_1=4$.

Thus, according to the present invention, the reduction in the output and the delay in the phase of an estimated disturbance signal are reduced with respect to a disturbance torque having a frequency within an estimated bandwidth obtained by a disturbance torque observer. As a result, the correction of the disturbance torque can be performed more accurately, whereby a more excellent disturbance suppression effect can be obtained.

Thus, the invention described herein makes possible an advantage of providing a control apparatus incorporating a novel disturbance torque observer capable of providing an enhanced disturbance suppression effect for a disturbance torque at a low frequency.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying figures.

EXAMPLE 1

Figure 1A:
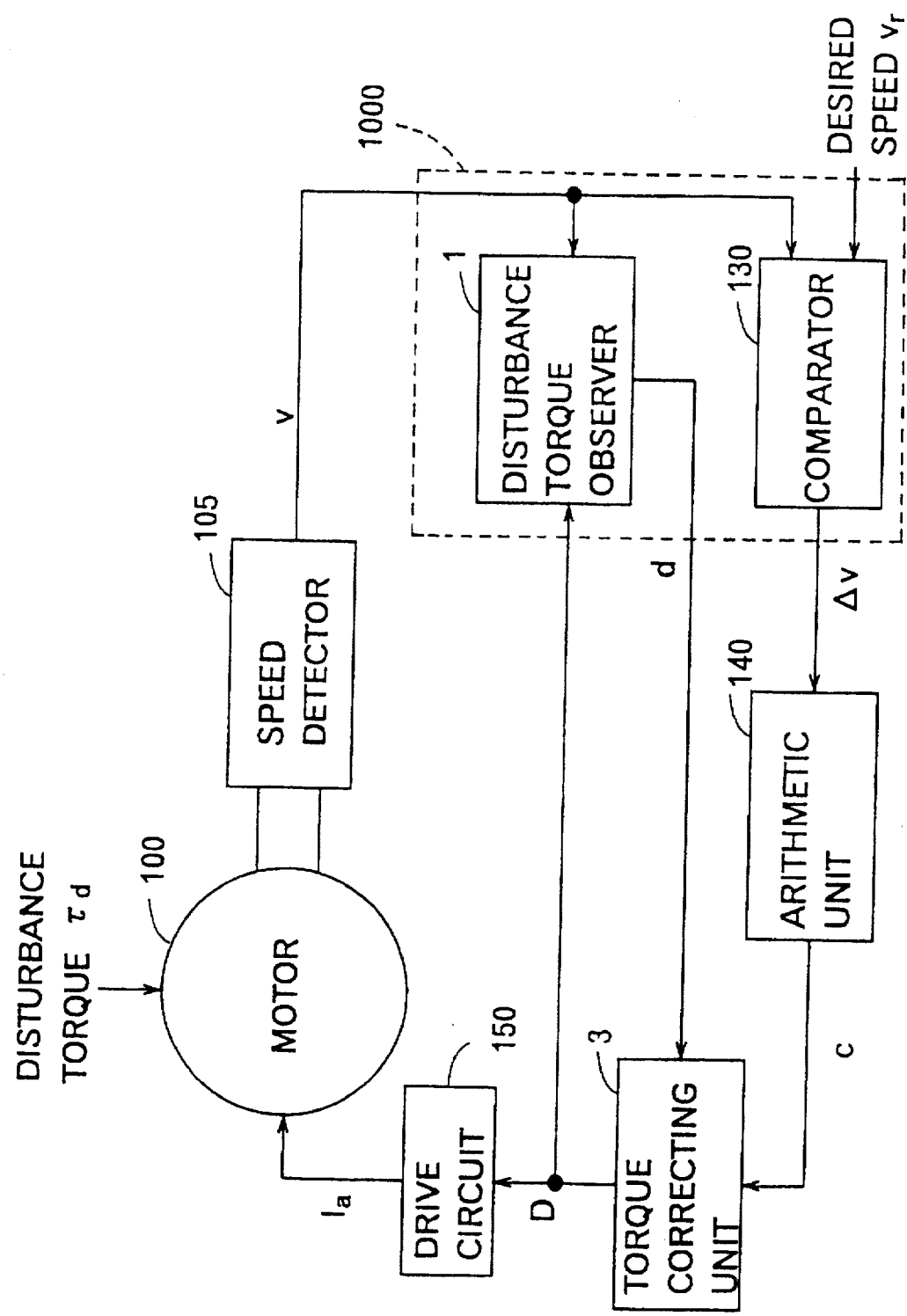
FIG. 1A is a schematic block diagram showing a configuration for a motor speed control apparatus according to Example 1 of the present invention.

Example 1 of the present invention will be described with reference to FIG. 1A. FIG. 1A schematically shows the configuration of a motor speed control apparatus according to Example 1.

A motor 100 is driven by a drive current $I_a$. A disturbance torque $\tau_d$ is applied to the motor 100. A speed detector 105 detects the rotation speed of the motor 100 so as to output a speed signal v. A comparator 130 outputs a speed error signal $\Delta v$ based on an offset between the detected speed signal v and a desired speed signal $v_r$ (which is a constant value). It is applicable to store the predetermined desired speed signal $v_r$ in a storing memory (not shown) of the motor speed control apparatus. Moreover, the desired speed signal $v_r$ may be input by a user from outside the motor speed control apparatus. An arithmetic unit 140 outputs a control signal c based on the speed error signal $\Delta v$. A torque correction unit 3 corrects the control signal c by using the estimated disturbance signal d, so as to output a drive signal D. The drive circuit 150 supplies the drive current $I_a$ to the motor 100 in accordance with the drive signal D.

The disturbance torque observer 1 estimates the disturbance torque $\tau_d$ based on the detected speed signal v and the drive signal D, so as to output the estimated disturbance signal d.

The motor speed control apparatus according to the present invention has the above-mentioned overall configuration. A speed control loop is constituted by the motor 100, the speed detector 105, the comparator 130, the arithmetic unit 140, the torque correction unit 3, and the drive circuit 150. A disturbance suppression loop is constituted by the torque correction unit 3 receiving the estimated disturbance signal d, which is output from the disturbance torque observer 1, and the disturbance torque observer 1 receiving the drive signal D, which is output from the torque correction unit 3.

Figure 1B:
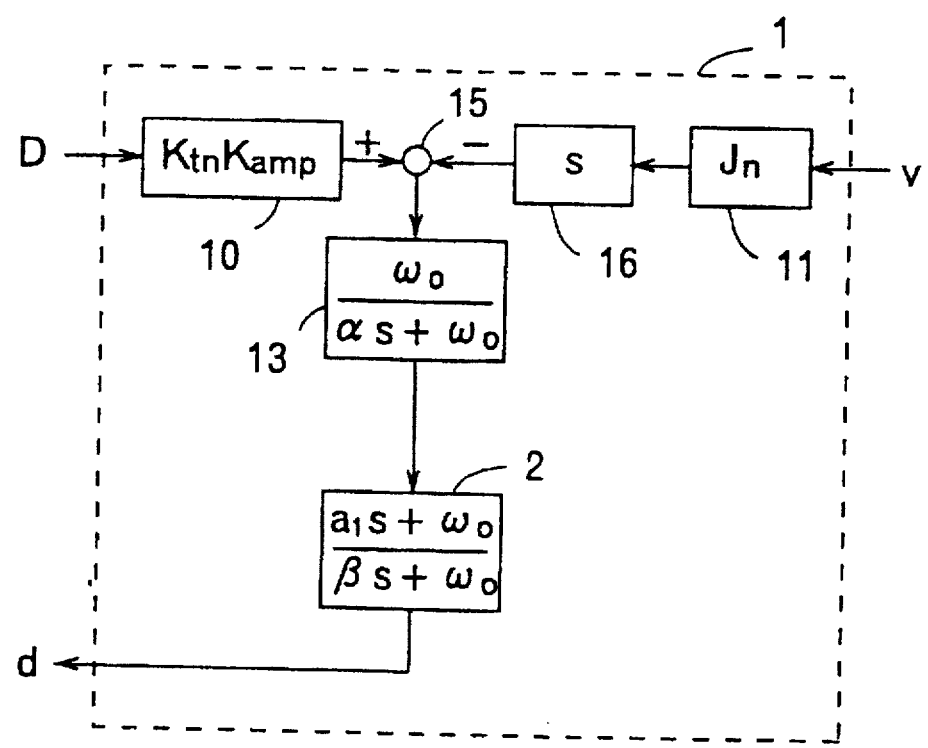
FIG. 1B is a block diagram showing a configuration for a disturbance torque observer according to Example 1 of the present invention.

Next, the configuration of the disturbance torque observer 1 will be described in detail. FIG. 1B is a block diagram showing the configuration of the disturbance torque observer according to Example 1 of the present invention. The disturbance torque observer 1 includes a multiplier 10, a multiplier 11, a subtracter 15, a differentiator 16, and filters 13 and 2. The multiplier 10 multiplies the drive signal D by a predetermined coefficient $K_m K_{amp}$ (where $K_m$ denotes the nominal value of the torque constant of the motor 100; $K_{amp}$ denotes a gain of the drive circuit 150). The multiplier 11 multiplies the detected speed signal v by a predetermined coefficient $J_n$ (where $J_n$ denotes the nominal value of the inertia of the motor 100). The differentiator 16 subjects a signal supplied from the multiplier 11 to a differentiation. The subtracter 15 subtracts the output of the differentiator 16 from the output of the multiplier 10. The filter 13 receives the output of the subtracter 15. The filter 13 performs an operation for the received signal based on a transfer function $\omega_o/(\alpha s+\omega_o)$. The filter 2 receives the output of the filter 13. The filter 2 performs an operation for the received signal based on a transfer function $(a_1 s+\omega_o)/(\beta s+\omega_o)$.

In the above transfer functions, s denotes a Laplacian; $a_1$, $\alpha$, and $\beta$ are positive constants satisfying the following relationship:

$$\alpha+\beta=a_1 \qquad \text{Eq.(1)}$$

and $\omega_o$ is a predetermined angular frequency. As described later, any speed fluctuation occurring due to a disturbance torque component having an angular frequency of $\omega_o$ or less is greatly reduced. The degree of reduction of the speed fluctuation due to disturbance torque components having frequencies in the vicinity of the angular frequency of $\omega_o$ depends on the values of $a_1$, $\alpha$, and $\beta$. Preferably, $a_1=4$; and $\alpha=\beta=2$.

Figure 1C:
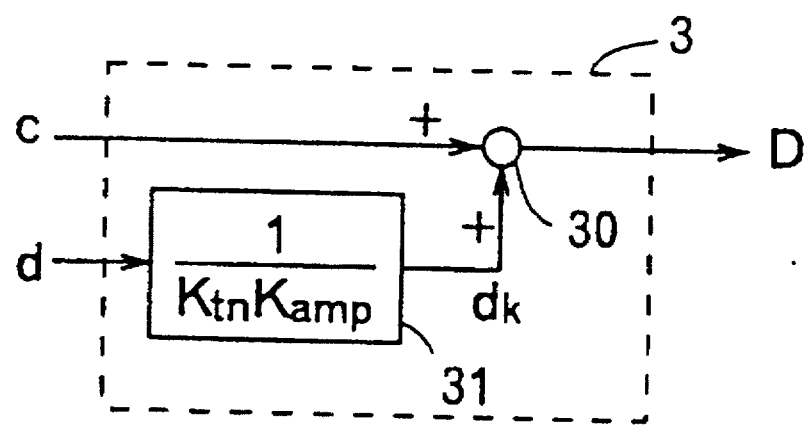
FIG. 1C is a block diagram showing a configuration for a torque correction unit according to Example 1 of the present invention.

Now, the torque correction unit 3 will be described in detail. FIG. 1C is a block diagram showing the configuration of the torque correction unit 3 according to Example 1 of the present invention. The torque correction unit 3 includes an adder 30 and a multiplier 31. The multiplier 31 multiplies the estimated disturbance signal d by a predetermined coefficient $1/K_m K_{amp}$. The adder 30 adds the control signal c and the output of the multiplier 31 so as to output the result of the addition as the drive signal D.

The motor speed control apparatus of Example 1 shown in FIG. 1A operates as follows.

The disturbance torque $\tau_d$ is applied to the motor 100. The speed detector 105 detects the rotation speed of the motor 100 so as to output the speed signal v. The comparator 130 subtracts the detected speed signal v from the desired speed signal $v_r$ so as to output the speed error signal $\Delta v$. The desired speed signal $v_r$ may be a constant value. The speed error signal $\Delta v$ is input to the arithmetic unit 140 so as to perform a predetermined control compensation e.g., proportional or integral compensation. The arithmetic unit 140 outputs the control signal c based on the speed error signal $\Delta v$. The control signal c is corrected by using the estimated disturbance signal d (to be described later), so as to give the drive signal D. The drive signal D is input to the drive circuit 150, so that the drive current $I_a$, which is in accordance with the drive signal D, is supplied to the motor 100. In the apparatus of the present invention, the motor 100 is driven in such a manner that the detected speed signal v coincides with the desired speed signal $V_r$. As a result, the speed of the motor 100 is kept constant. Thus, the fundamental operation of the motor speed control apparatus of the present invention has been described.

Next, the disturbance suppression according to the present invention will be described with reference to FIG. 1B.

The detected speed signal v indicating a detected value of the speed of the motor 100 is input to the multiplier 11 so as to be multiplied by the coefficient $J_n$. The output of the multiplier 11 is subjected to a differentiation by the differentiator 16. The drive signal D is input to the multiplier 10 so as to be multiplied by the coefficient $K_m K_{amp}$. The subtracter 15 subtracts the output of the differentiator 16 from the output of the multiplier 10. The filter 13 receives the result of the subtraction by the subtracter 15 and performs a filtering operation for the received signal based on a transfer function $\omega_o/(\alpha s+\omega_o)$. The output of the filter 13 is coupled to the filter 2, which performs a filtering operation for the received signal based on a transfer function $(a_1 s+\omega_o)/(\beta s+\omega_o)$. As a result, the filter 2 outputs the estimated disturbance signal d. Thus, the operation of the disturbance torque observer 1 of the present invention has been described.

Next, an operation of the torque correction unit 3 will be described with reference to FIG. 1C. The torque correction unit 3, which includes the adder 30 and the multiplier 31, receives the estimated disturbance signal d output from the disturbance torque observer 1 and the control signal c output from the arithmetic unit 140. The multiplier 31 receives the estimated disturbance signal d and multiplies the estimated disturbance signal d by the coefficient $1/K_{tn}K_{amp}$. Thus, the estimated disturbance signal d becomes a conversion signal $d_k$ of the estimated disturbance torque. As described above, the adder 30 adds the conversion signal $d_k$ of the estimated disturbance torque and the control c. The operation of the adder 30 and the multiplier 31 is the operation of the torque correction unit 3. By adding the conversion signal $d_k$ of the estimated disturbance torque to the control c, the influence of the disturbance torque $\tau_d$ on the control signal c is reduced.

Next, the disturbance torque suppression effect of Example 1 of the present invention will be described by employing equations. It is assumed that the inertia J and the torque constant $K_t$ of the motor 100 are equal to their respective nominal values $J_n$ and $K_{tn}$, and will be indicated as J and $K_t$.

The estimated disturbance signal d is expressed as follows by using the detected speed signal v and the drive signal D:

$$d = \{\omega_o/(\alpha s + \omega_o)\} \cdot \{(a_1 s + \omega_o)/(\beta s + \omega_o)\} \cdot \quad \text{Eq.(2)}$$
$$(K_t K_{amp} D - Jsv) = [(a_1 \omega_o s + \omega_o^2)/\{\alpha\beta s^2 + (\alpha + \beta)\omega_o s + \omega_o^2\}] \cdot (K_t K_{amp} D - Jsv)$$

Eq. (2) is expressed as follows, in accordance with Eq. (1):

$$d = \{(a_1 \omega_o s + \omega_o^2)/(\alpha\beta s^2 + a_1 \omega_o s + \omega_o^2)\} \cdot (K_t K_{amp} D - Jsv) \quad \text{Eq.(3)}$$

The disturbance torque $\tau_d$ applied to the motor 100, the drive signal D supplied to the drive circuit 150, and the detected speed signal v of the motor 100 satisfy the following relationship. (Herein, the transfer function of the speed detector 105 is assumed to be 1).

$$\tau_d = K_t K_{amp} D - Jsv \quad \text{Eq.(4)}$$

Therefore, in accordance with Eq.(3) and (4), the estimated disturbance signal d is derived to be:

$$d = \{(a_1 \omega_o s + \omega_o^2)/(\alpha\beta s^2 + a_1 \omega_o s + \omega_o^2)\} \cdot \tau_d \quad \text{Eq.(5)}$$

In accordance with Eq.(5), a transfer function Q(s) taken from the disturbance torque $\tau_d$ applied to the motor 100 to the estimated disturbance signal d is derived to be:

$$Q(s) = d/\tau_d \quad \text{Eq.(6)}$$
$$= (a_1 \omega_o s + \omega_o^2)/(\alpha\beta s^2 + a_1 \omega_o s + \omega_o^2)$$

Thus, the frequency characteristics of the Q(s) are determined by the constants $a_1$, $\alpha$, $\beta$, and $\omega_o$. The frequency characteristics in the vicinity of the angular frequency $\omega_o$ vary in accordance with the values of these constants.

Figure 2:
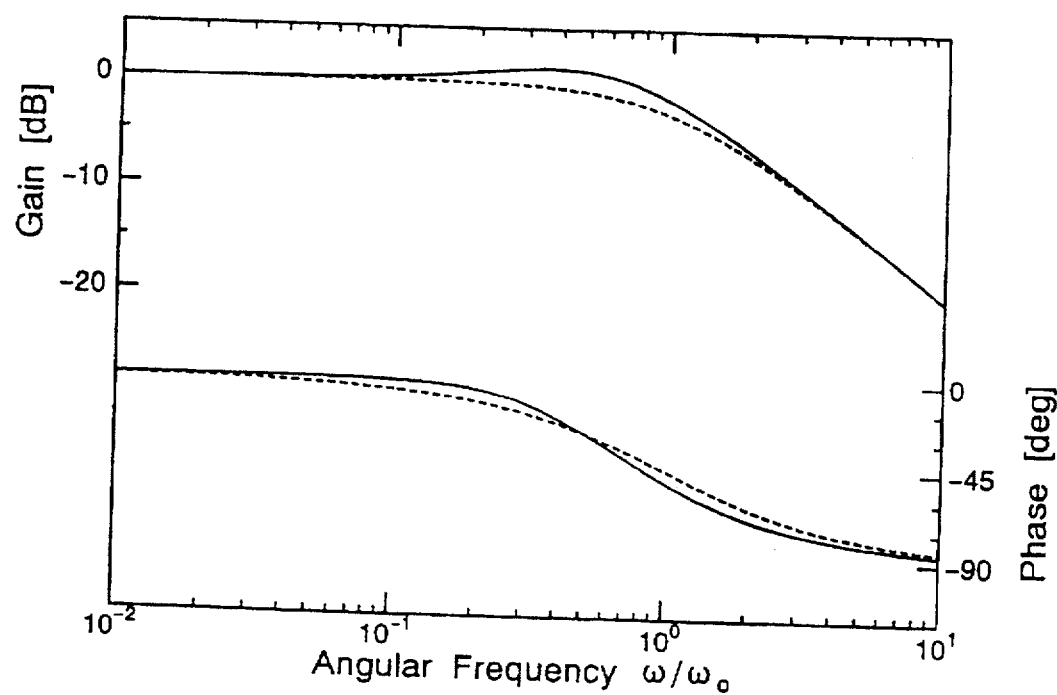
FIG. 2 is a frequency characteristics diagram showing the relationship between an estimated disturbance signal d and a disturbance torque $\tau_d$.
Figure 9:
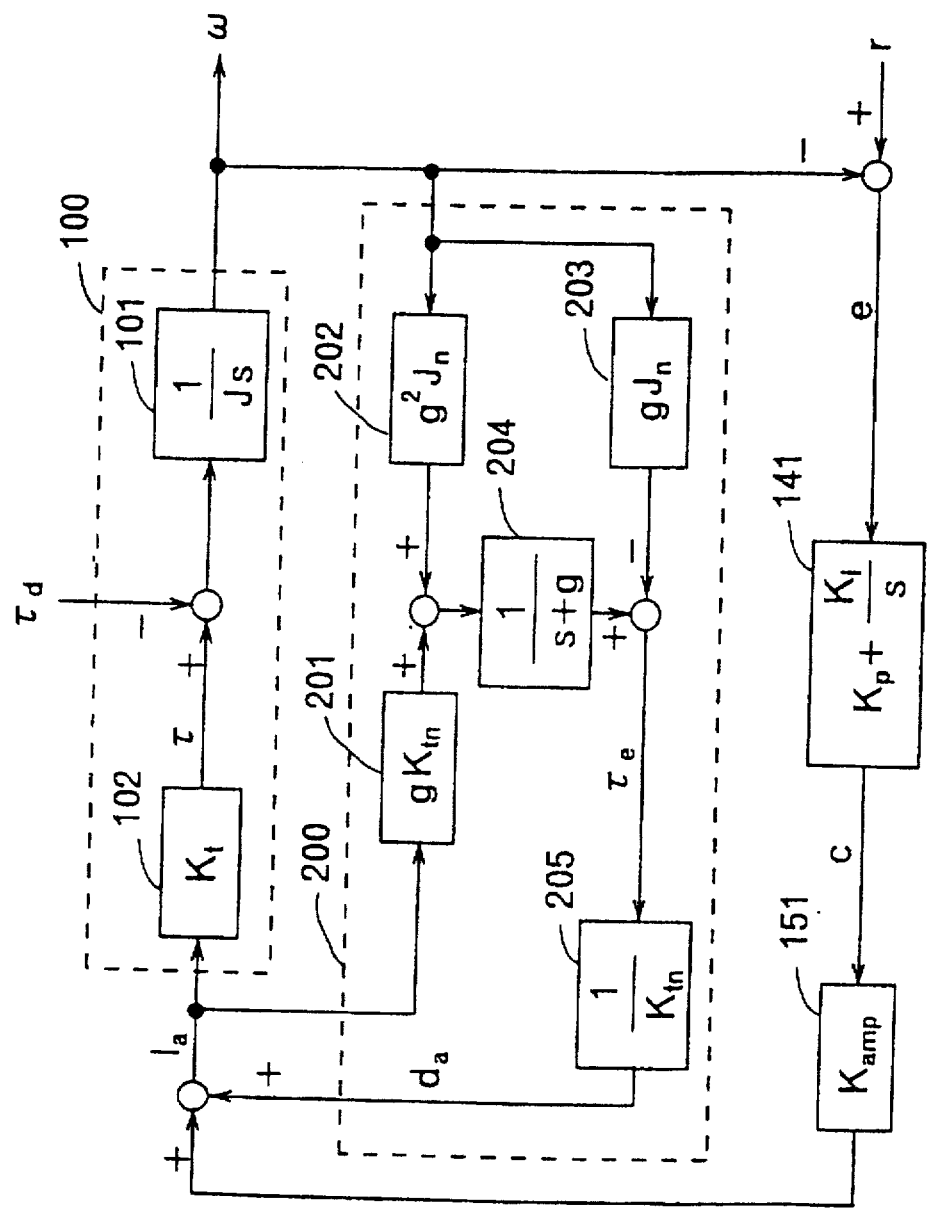
FIG. 9 is a block diagram showing a motor speed control apparatus incorporating a conventional disturbance torque observer.

FIG. 2 is a Bode diagram showing frequency characteristics of the transfer function Q(s). The frequency characteristics and the phase characteristics calculated by assuming that $a_1$ and $\alpha\beta$ in Q(s) are both 4 are indicated by the solid lines in FIG. 2. The broken lines in FIG. 2 represent the frequency characteristics and the phase characteristics of a transfer function $Q_a(s)$ of the conventional apparatus shown in FIG. 9, taken from the disturbance torque $\tau_d$ applied to the motor 100 to an estimated disturbance signal $d_a$. Angular frequencies normalized by $\omega_o$ are taken on the axis of abscissas of the Bode diagram.

The Bode diagram in FIG. 2 indicates that the transfer function Q(s) has the characteristics of a low pass filter having cut-off characteristics of $-20$ dB/dec in the cut-off band thereof. Moreover, as seen from FIG. 2, the problem of reduction in output is reduced in the transfer function Q(s) in a frequency region where the normalized angular frequency $\omega/\omega_o$ is lower than 1, as compared with the characteristics of the conventional low pass filter shown by the solid line. Also, the problem of phase delay is reduced in the transfer function Q(s) in the above-mentioned frequency region as compared with the characteristics of the conventional low pass filter shown by the solid line.

Next, in accordance with Eq.(5), the conversion signal $d_k$ of the estimated disturbance torque is expressed by the following Eq.(7):

$$d_k = \{1/(K_t K_{amp})\} \cdot d \quad \text{Eq.(7)}$$
$$= \{(a_1 \omega_o s + \omega_o^2)/(\alpha\beta s^2 + a_1 \omega_o s + \omega_o^2)\} \cdot$$
$$\{1/(K_t K_{amp})\} \cdot \tau_d$$

From Eq.(7), it will be seen that the conversion signal $d_k$ of the estimated disturbance torque has the same dimension as that of the drive signal D. Specifically, the coefficient $1/(K_{tn} K_{amp})$ converts the dimension of the estimated disturbance signal d into the dimension of the drive signal D, whereby the conversion signal $d_k$ of the estimated disturbance torque is obtained.

By employing the above equations, a transfer function $G_i(s)$ taken from the disturbance torque $\tau_d$ to the angular speed is calculated as follows:

$$G_i(s) = \{1 - Q(s)\} \cdot G_c(s) \quad \text{Eq.(8)}$$
$$= \{\alpha\beta s^2/(\alpha\beta s^2 + a_1 \omega_o s + \omega_o^2)\} \cdot G_c(s)$$

where the transfer function $G_c(s)$ represents a transfer function taken from the disturbance torque $\tau_d$ to the angular speed in the case where the disturbance torque observer 1 is not provided. The transfer function $G_c(s)$ may be expressed as follows:

$$G_c(s) = \{1/(Js)\}/\{1 + 1/(Js) \cdot K_t \cdot K_{amp} \cdot H(s)\} \quad \text{Eq.(9)}$$

where the transfer function H(s) represents a transfer function of the arithmetic unit 140, that is, a transfer function taken from the speed error signal $\Delta v$ to the control signal c. For conciseness, the transfer function of the speed detector 105 is assumed to be 1.

The disturbance torque suppression effect by Example 1 of the present invention is expressed by the following equation: $E(s) = 1 - Q(s) = \alpha\beta s^2/(\alpha\beta s^2 + a_1 \omega_o s + \omega_o^2)$.

Figure 3:
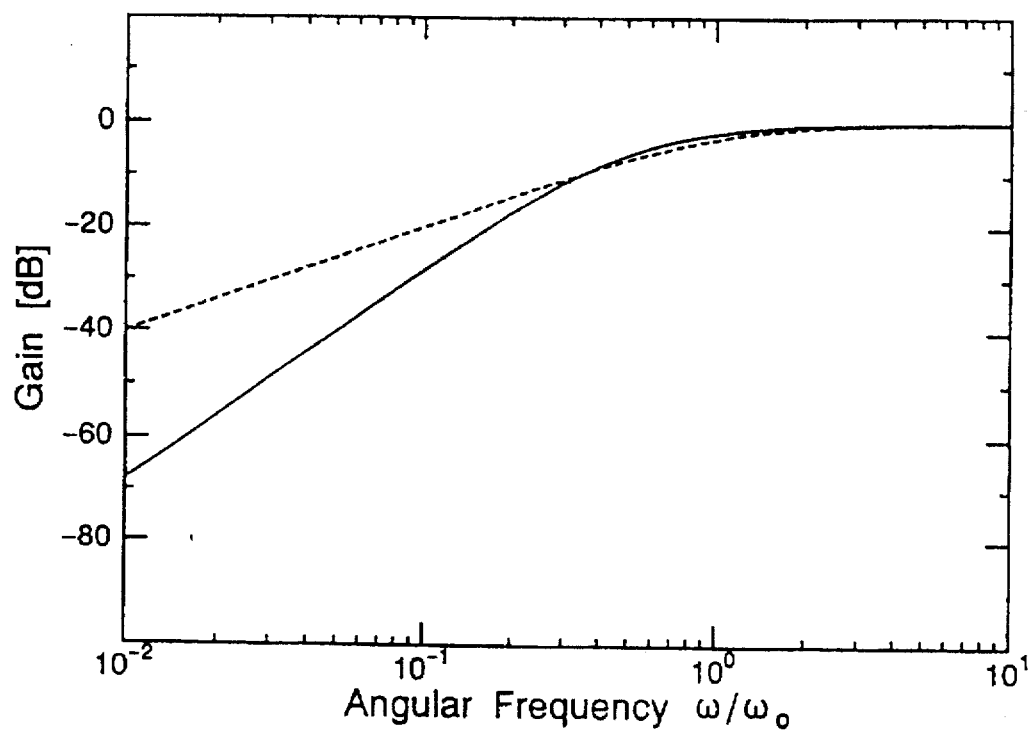
FIG. 3 is a frequency characteristics diagram for describing the disturbance suppression effect attained in Example 1 of the present invention.

FIG. 3 is a diagram showing an exemplary relationship between the gain and the frequency of the transfer function E(s). As in FIG. 2, angular frequencies normalized by $\omega_o$ are taken on the axis of abscissas of the Bode diagram in FIG. 3. The solid line in FIG. 3 indicates the gain-frequency characteristics of the transfer function E(s) in the case where $a_1$ and $\alpha\beta$ in E(s) are both assumed to be 4. The broken line in FIG. 3 represents the gain-frequency characteristics of a transfer function $E_a(s)$ of the conventional apparatus shown in FIG. 9, taken from the disturbance torque $\tau_d$ applied to the motor 100 to an angular speed $\omega$ under the assumption that $g = \omega_o$. The transfer function $E_a(s)$ satisfies the relationship $E_a(s) = s/(s + \omega_o)$.

As seen from FIG. 3, the high pass angular frequency of the transfer function E(s) is the angular frequency $\omega_o$. The transfer function E(s) has cut-off characteristics of 40 dB/dec in a cut-off region (i.e., a frequency region equal to or below the cut-off angular frequency $\omega_o$). That is, the transfer function E(s) has characteristics of a high pass filter.

As the gain of the transfer function $G_i(s)$ decreases, the influence of the disturbance torque on the motor 100 is reduced. Therefore, according to Example 1, the speed fluctuation occurring due to the disturbance torque $\tau_d$ can be reduced so that the disturbance sensitivity is improved by 40 dB/dec in a low frequency region equal to or below the angular frequency $\omega_o$, as compared with a case where no correction is performed for the disturbance torque.

Thus, according to Example 1 of the present invention, an excellent disturbance suppression effect can be obtained. In particular, the speed fluctuation occurring due to disturbance torques at low frequencies can be greatly reduced. Since the filters 13 and 2, which are first-order filters, are connected in series with each other, the serially-connected filters 13 and 2 equivalently constitutes a second-order low pass filter having the low pass characteristics of −20 dB/dec, so that the connected filters 13 and 2 do not respond in any vibratory manners.

When implementing the filters 13 and 2 by using a specific hardware configuration, it is preferable that the coefficients $a_1$, $\alpha$ and $\beta$ of the filters 13 and 2 satisfy the relationship $a_1=4$ and $\alpha\beta=4$. Under these conditions, the transfer function of the filter 13 is $\omega_o/(2s+\omega_o)$, and the transfer function of the filter 2 is $(4s+\omega_o)/(2s+\omega_o)$. A transfer function TF(S) of the second-order filter (consisting of the filters 13 and 2) satisfies the relationship $TF(S)=2\omega_o/(2s+\omega_o)-\{\omega_o/(2s+\omega_o)\}^2$. First, $\omega_o/(2s+\omega_o)$ is calculated. In the case where a shift register is employed, the first term of TF(S) can be calculated by shifting the result of the calculation $\omega_o/(2s+\omega_o)$. The second term of TF(S) can be calculated by using the $\omega_o/(2s+\omega_o)$, which has already been obtained. In other words, the hardware configuration can be simplified by ensuring that relationships $a_1=4$ and $\alpha\beta=4$ hold, thereby reducing the amount of time required for the mathematical operations. Similar effects can be attained by conducting the calculations for the filters 13 and 2 by a computer.

EXAMPLE 2

Next, Example 2 of the present invention will be described. A disturbance torque observer 1 of the motor speed control apparatus according to Example 2 does not include any differentiators. The configuration and the operation of the motor speed control apparatus of Example 2 are the same as those of the apparatus of Example 1 except for the disturbance torque observer 1.

Figure 4:
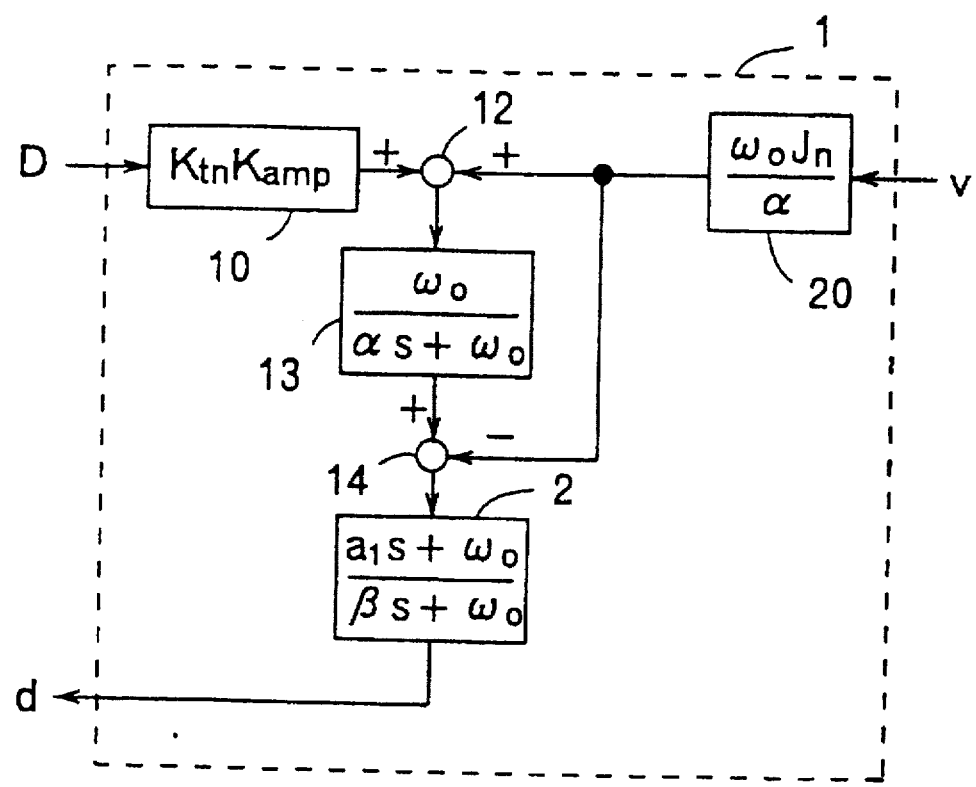
FIG. 4 is a block diagram showing a configuration for a disturbance torque observer according to Example 2 of the present invention.

Hereinafter, the configuration of the disturbance torque observer 1 will be described with reference to FIG. 4 in detail. Like constituent elements are indicated by like reference numerals in FIG. 4, and the descriptions thereof are omitted.

A multiplier 20 multiplies a detected speed signal v by a predetermined coefficient $\omega_o J_n/\alpha$. The multiplier 20 is connected to an adder 12 and a subtracter 14. The subtracter 14 receives the output of a filter 13 and the multiplier 20. The subtracter 14 subtracts the output of the multiplier 20 from the output of the filter 13 so as to output the result of the subtraction to a filter 2.

The detected speed signal v indicating a detected value of the speed of the motor 100 is input to the multiplier 20 so as to be multiplied by the coefficient $\omega_o J_n/\alpha$. A drive signal D is input to the multiplier 10 so as to be multiplied by the coefficient $K_{mn}K_{amp}$. The outputs of multipliers 10 and 20 are added with each other by an adder 12. The result of the addition is input to the filter 13 so as to be subjected to a filtering process expressed by a transfer function $\omega_o/(\alpha s+\omega_o)$. As described above, the subtracter 14 receives the outputs of the filter 13 and the multiplier 20. The subtracter 14 subtracts the output of the multiplier 20 from the output of the filter 13. The filter 2 receives the result of the subtraction by the subtracter 14 and performs a filtering operation for the received signal based on a transfer function $(a_1s+\omega_o)/(\beta s+\omega_o)$, and outputs the processed signal as an estimated disturbance signal d. As in Example 1, the estimated disturbance signal d is input to the torque correction unit 3 shown in FIG. 1C. A multiplier 31 multiplies the estimated disturbance signal d by a coefficient $1/(K_{tn}K_{amp})$ so as to output the result of the multiplication as a conversion signal $d_k$ of the estimated disturbance torque. The conversion signal $d_k$ of the estimated disturbance torque is added to a control signal c by the adder 30. By adding the conversion signal $d_k$ of the estimated disturbance torque to the control c, the influence of a disturbance torque $\tau_d$ on the control signal c is reduced.

Next, the disturbance torque suppression effect according to Example 2 of the present invention will be described by employing equations. It is assumed that an inertia J and a torque constant $K_t$ of the motor 100 are equal to their respective nominal values $J_n$ and $K_{tn}$, and will be indicated as J and $K_t$.

As seen from the block diagram shown in FIG. 4, the estimated disturbance signal d is expressed as follows by using the detected speed signal v and the drive signal D:

$$\begin{aligned}
d &= [\{\omega_o/(\alpha s+\omega_o)\}\cdot(K_tK_{amp}D+(\omega_oJ/\alpha)v) - \\
&\quad (\omega_oJ/\alpha)v]\cdot\{(a_1s+\omega_o)/(\beta s+\omega_o)\} \\
&= \{\omega_o/(\alpha s+\omega_o)\}\cdot\{(a_1s+\omega_o)/(\beta s+\omega_o)\}\cdot \\
&\quad (K_tK_{amp}D-Jsv) \\
&= [(a_1\omega_os+\omega_o^2)/\{\alpha\beta s^2+(\alpha+\beta)\omega_os+\omega_o^2\}]\cdot \\
&\quad (K_tK_{amp}D-Jsv)
\end{aligned} \quad \text{Eq.(10)}$$

Eq.(10) is expressed as follows, in accordance with Eq. (1):

$$d=\{(a_1\omega_os+\omega_o^2)/(\alpha\beta s^2+a_1\omega_os+\omega_o^2)\}\cdot(K_tK_{amp}D-Jsv) \quad \text{Eq.(11)}$$

As seen from Eq.(11), the estimated disturbance signal d according to Example 2 is identical with the estimated disturbance signal d according to Example 1 expressed by Eq.(3). Accordingly, a transfer function taken from the disturbance torque $\tau_d$ to a speed of the motor 10 is expressed by Eq.(8), so that the same disturbance suppression effect as in Example 1 can be obtained in Example 2.

Thus, according to Example 2 of the present invention, the disturbance torque observer 1 can be constructed without using a differentiator. As a result, accurate estimation and correction of the disturbance torque can be achieved without the disadvantage of a differentiator being influenced by a high frequency noise. Since the motor speed control apparatuses of Examples 3 to 6 (to be described later) also do not include any differentiators, they are free from the influence of high frequency noises, too, as well as achieving the same excellent disturbance suppression effect as that attained according to Example 1.

EXAMPLE 3

Next, Example 3 of the present invention will be described. A disturbance torque observer 1 of the motor speed control apparatus according to Example 3 has the same general configuration as that of the apparatus of Example 1 (shown in FIG. 1A). The apparatus of Example 3 differs from the configuration described in Example 2 only with respect to a disturbance torque observer 1 and a torque correction unit 3. Therefore, descriptions will be offered only for the configurations of the disturbance torque observer 1 and the torque correction unit 3.

Figure 5A:
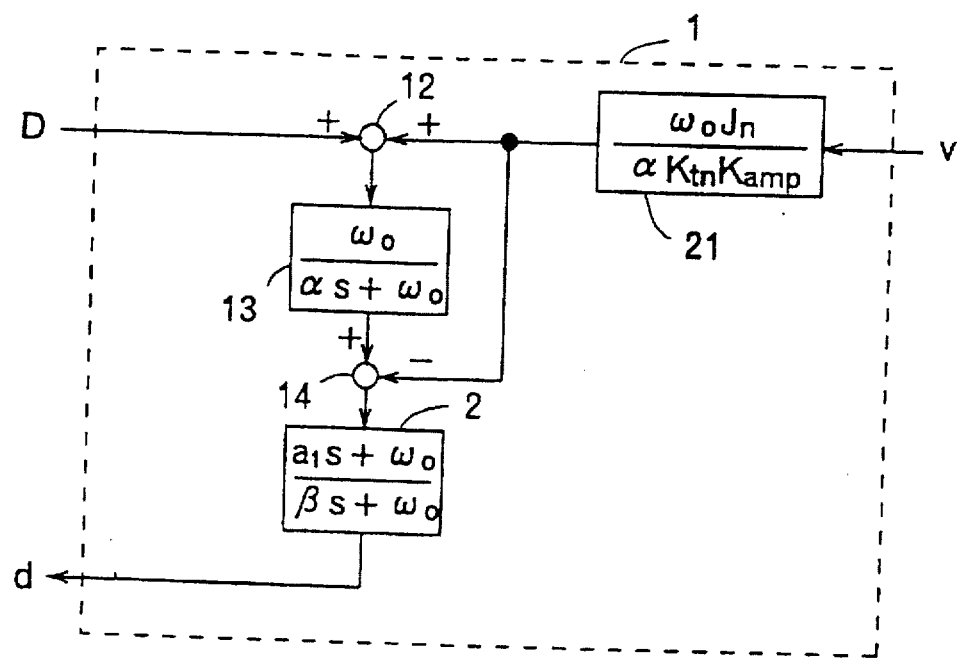
FIG. 5A is a block diagram showing a configuration for a disturbance torque observer according to Example 3 of the present invention.

FIG. 5A is a block diagram showing the configuration of the disturbance torque observer 1 according to Example 3. The disturbance torque observer 1 of the present example differs from the disturbance torque observer 1 of Example 2 with respect to the multipliers 10 and 20 of Example 2. Otherwise, like constituent elements are indicated by like reference numerals in FIG. 5A, and the descriptions thereof are omitted.

Hereinafter, the disturbance suppression according to the present invention will be described. A detected speed signal v indicating a detected value of the speed of the motor 100 (not shown in FIG. 5A) is input to a multiplier 21 so as to be multiplied by a coefficient $(\omega_o J_n)/(\alpha K_{tn} K_{amp})$. The output of the multiplier 21 is added with a drive signal D by an adder 12. The result of the addition is subjected to a filtering process expressed by a transfer function $\omega_o/(\alpha s + \omega_o)$ of a filter 13. A subtracter 14 receives the output of the filter 13 and the output of the multiplier 21, and subtracts the output of the multiplier 21 from the output of the filter 13 so as to output the result of the subtraction. The output signal of the subtracter 14 is subjected to a filtering process expressed by a transfer function $(a_1 s + \omega_o)/(\beta s + \omega_o)$ of the filter 2. The filter 2 outputs the processed signal as an estimated disturbance signal d. Thus, the operation of the disturbance torque observer 1 of the present example has been described.

Figure 5B:
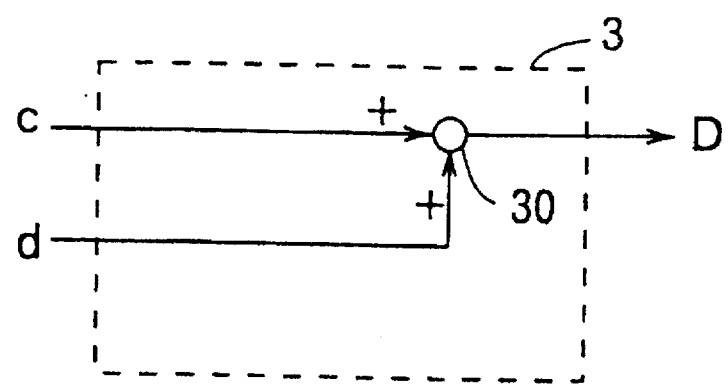
FIG. 5B is a block diagram showing a configuration for a torque correction unit according to Example 3 of the present invention.

FIG. 5B is a block diagram showing the configuration of the torque correction unit 3 according to Example 3. The configuration of the torque correction unit 3 of the present example is the same as that of the torque correction units 3 of Example 1 and Example 2 except that no multiplier 31 is included. Like constituent elements are indicated by like reference numerals in FIG. 5B, and the descriptions thereof are omitted.

The estimated disturbance signal d is added to a control signal c by an adder 30. The operation of the adder 30 is equivalent to the operation of the torque correction unit 3. By correcting the control signal c by using the estimated disturbance signal d, the influence of a disturbance torque $\tau_d$ on the control signal c is reduced.

Next, the disturbance torque suppression effect according to Example 3 of the present invention will be described by employing equations. It is assumed that an inertia J and a torque constant $K_t$ of the motor 100 are equal to their respective nominal values $J_n$ and $K_{tn}$, and will be indicated as J and $K_t$.

As seen from the block diagram shown in FIG. 5A, the estimated disturbance signal d is expressed as follows by using the detected speed signal v and the drive signal D:

$$d = [\{\omega_o/(\alpha s + \omega_o)\} \cdot \{D + \omega_o J/(\alpha K_t K_{amp})v\} - \omega_o J/(\alpha K_t K_{amp})v] \cdot \{(a_1 s + \omega_o)/(\beta s + \omega_o)\}$$

$$= \{\omega_o/(\alpha s + \omega_o)\} \cdot \{(a_1 s + \omega_o)/(\beta s + \omega_o)\} \cdot (D - J/(K_t K_{amp})sv)$$

$$= [(a_1 \omega_o s + \omega_o^2)/\{\alpha \beta s^2 + (\alpha + \beta)\omega_o s + \omega_o^2\}] \cdot (D - J/(K_t K_{amp})sv)$$

Eq.(12)

Eq.(12) is expressed as follows, in accordance with Eq. (1):

$$d = \{(a_1 \omega_o s + \omega_o^2)/(\alpha \beta s^2 + a_1 \omega_o s + \omega_o^2)\} \cdot (D - J/(K_t K_{amp})sv) \quad \text{Eq.(13)}$$

On the other hand, the relationship expressed by Eq.(4) holds regarding the motor 100. By using this relationship, Eq.(13) is modified as follows:

$$d = \{(a_1 \omega_o s + \omega_o^2)/(\alpha \beta s^2 + a_1 \omega_o s + \omega_o^2)\} \cdot \{(1/K_t K_{amp})\} \cdot \tau_d \quad \text{Eq.(14)}$$

As seen from Eq.(14), the estimated disturbance signal d according to Example 3 is identical with the conversion signal $d_k$ of the estimated disturbance torque according to Example 1 or 2. Accordingly, the estimated disturbance signal d can be added intact to the control signal c so as to compensate for the disturbance torque. As a result, the same disturbance suppression effect as in Examples 1 and 2 can be obtained in Example 3.

Thus, according to Example 3, a value obtained by converting the disturbance torque into a drive signal is estimated instead of estimating the disturbance torque itself. As a result, the disturbance torque observer 1 is not required to incorporate a differentiator. Moreover, the number of the multipliers to be included in the disturbance torque observer 1 and the multipliers to be included in the torque correction unit 3 can be reduced. Thus, according to Example 3, an excellent disturbance suppression effect can be obtained with a simplified configuration. When implementing the present invention by using hardware configurations such as analog or digital circuits, the number of constituent elements is small so that the adjustment of the circuit can be simplified. When implementing the present invention by a software servo method employing a computer, the number of constituent elements is also small so that any delay occurring in the mathematical operations can be reduced.

EXAMPLE 4

Next, Example 4 of the present invention will be described. According to Example 4, a speed error signal is used instead of a detected speed signal.

Figure 6A:
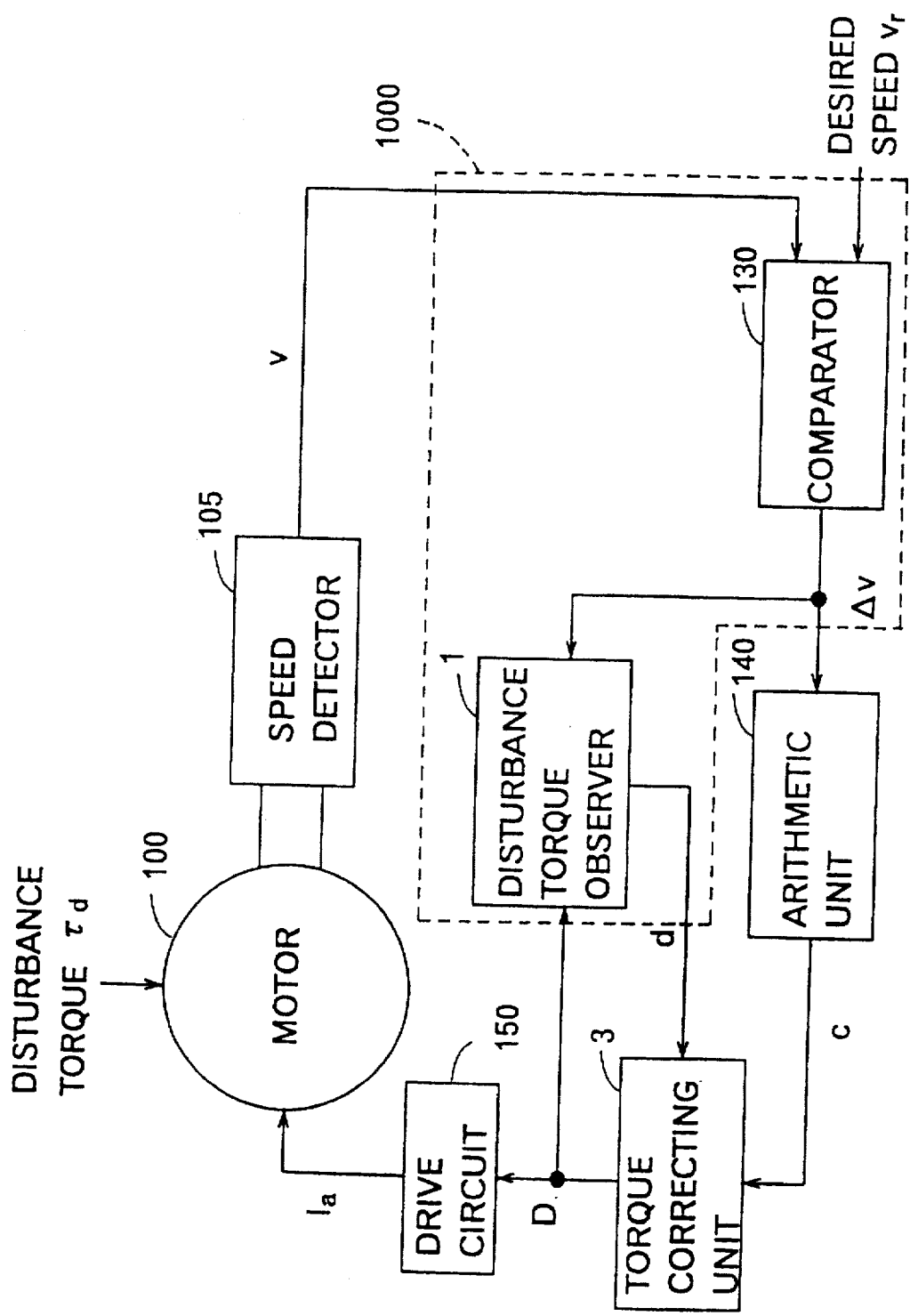
FIG. 6A is a schematic block diagram showing a configuration for a motor speed control apparatus according to Example 4 of the present invention.

FIG. 6A is a block diagram showing the configuration of a motor speed control apparatus according to Example 4 of the present invention. Constituent elements that are identical with those employed in Example 1 are indicated by the same reference numerals as used therein.

A speed detector 105 outputs a speed signal v to a comparator 130. The comparator 130 receives a desired speed signal $v_r$ and the speed signal v so as to derive a difference therebetween. The comparator 130 outputs a speed error signal $\Delta v$, which is the difference between the speed signal v and the desired speed signal $v_r$, to an arithmetic unit 140 and a disturbance torque observer 1. The configuration of the disturbance torque observer 1 of Example 4 is the same as that of the disturbance torque observer 1 of Example 1, 2, or 3 except that the speed error signal $\Delta v$ is input thereto instead of the detected speed signal v. Since the other constituent elements are identical with those shown in FIG. 1A, the descriptions thereof are omitted.

Figure 6B:
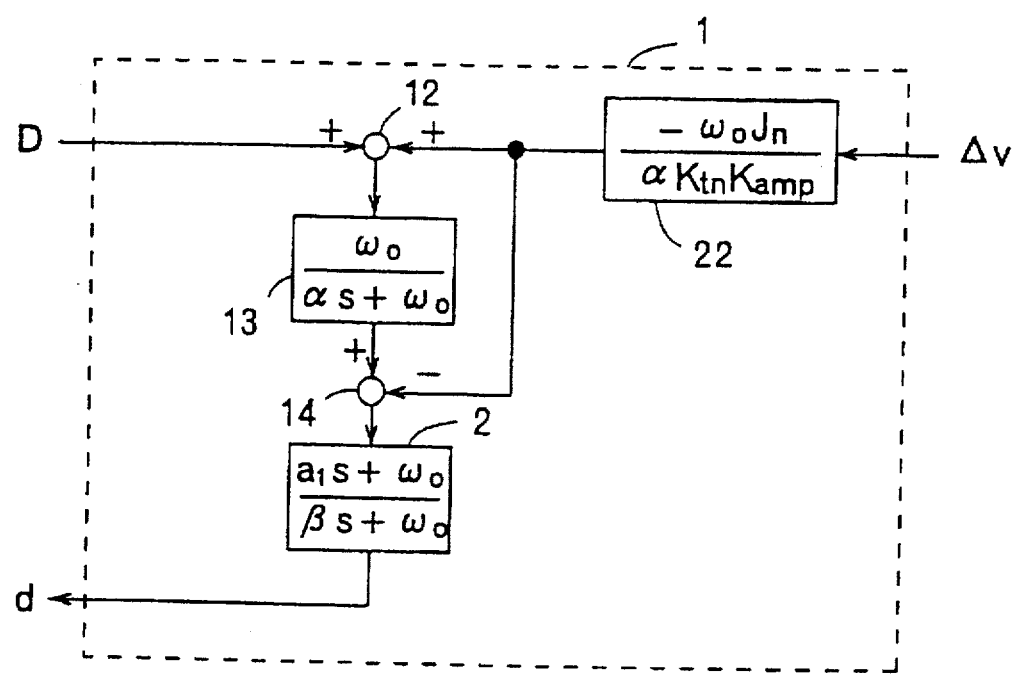
FIG. 6B is a block diagram showing a configuration for a disturbance torque observer according to Example 4 of the present invention.

FIG. 6B is a block diagram showing the configuration of the disturbance torque observer 1 according to Example 4. The configuration of the disturbance torque observer 1 of the present example is the same as that of the disturbance torque observer 1 of Example 3 except for the multiplier 21. A multiplier 22 of the disturbance torque observer 1 of Example 4 multiplies an input signal by a coefficient $(-\omega_o J_n)/(\alpha K_t K_{amp})$. As will be appreciated, the sign of the coefficient is different from the coefficient $(\omega_o J_n)/(\alpha K_t K_{amp})$ by which the multiplier 21 of Example 3 multipliers an input signal.

The torque correction unit 3 has the same configuration as that of the torque correction unit 3 of Example 3 (shown in FIG. 5B).

Next, the operation of the disturbance torque observer 1 according to Example 4, which is different from the operation of the disturbance torque observer 1 of Example 3, will be described. Since the operations of the other constituent elements of the motor speed control apparatus of Example 4 are the same as in Example 3, the descriptions thereof are omitted.

A speed error signal $\Delta v$, which is output from a comparator 130, is multiplied by a predetermined coefficient $(-\omega_o J_n)/(\alpha K_m K_{amp})$ by the multiplier 22. The output of the multiplier 22 is added with a drive signal D, which is output from the torque correction unit 3, by an adder 12. The output of the adder 12 is subjected to a filtering process expressed by a transfer function $\omega_o/(\alpha s+\omega_o)$ of a filter 13. The subtracter 14 subtracts the output of the multiplier 22 from the output of the filter 13 so as to output the result of the subtraction. The output signal of the subtracter 14 is subjected to a filtering process expressed by a transfer function $(a_1 s+\omega_o)/(\beta s+\omega_o)$ of the filter 2. The filter 2 outputs the processed signal as an estimated disturbance signal d. Thus, the operation of the disturbance torque observer 1 of the present example has been described. As shown in FIG. 5B, the torque correction unit 3 adds the estimated disturbance signal d to a control signal c, which is output from the arithmetic unit 140. As a result, the influence of a disturbance torque $\tau_d$ on the control signal c is cancelled, thereby reducing the speed fluctuation of a motor 100.

Next, the disturbance torque suppression effect according to Example 4 of the present invention will be described by employing equations. It is assumed that an inertia J and a torque constant $K_t$ of the motor 100 are equal to their respective nominal values $J_n$ and $K_{tn}$, and will be indicated as J and $K_t$.

As seen from the block diagram of the disturbance torque observer 1 shown in FIG. 6B, the estimated disturbance signal d is expressed as follows by using the speed error signal $\Delta v$ and the drive signal D:

$$\begin{aligned}d &= [\{\omega_o/(\alpha s+\omega_o)\} \cdot \{D - \omega_o J/(\alpha K_t K_{amp})\Delta v\} + \\ &\quad \omega_o J/(\alpha K_t K_{amp})\Delta v] \cdot \{(a_1 s+\omega_o)/(\beta s+\omega_o)\} \\ &= \{\omega_o/(\alpha s+\omega_o)\} \cdot \{(a_1 s+\omega_o)/(\beta s+\omega_o)\} \cdot \\ &\quad (D + J/(K_t K_{amp})s\Delta v) \\ &= [(a_1\omega_o s+\omega_o^2)/\{\alpha\beta s^2 + (\alpha+\beta)\omega_o s+\omega_o^2\}] \cdot \\ &\quad \{D + J/(K_t K_{amp})s\Delta v\}\end{aligned}$$ Eq.(15)

Eq.(15) is expressed as follows, in accordance with Eq. (1):

$$d=\{(a_1\omega_o s+\omega_o^2)/(\alpha\beta s^2+a_1\omega_o s+\omega_o^2)\}\cdot\{D+J/(K_t K_{amp})s\Delta v\}$$ Eq.(16)

By assuming x(t) to be a function of the speed error signal $\Delta v$ in the time domain, and y(t) to be a function of the detected speed signal v in the time domain, that is, $$\Delta v = L\{x(t)\}, v=L\{y(t)\}$$ Eq.(17)

where L represents Laplacian transform, the following relationship holds:

$$x(t)=v_r-y(t)$$ Eq.(18)

Since the desired speed signal $v_r$ is a constant value, both sides of Eq.(18) are subjected to differentiation by time (t) to give the following:

$$dx/dt=-dy/dt$$ Eq.(19)

By subjecting both sides of Eq. (19) to Laplacian transform in accordance with Eq. (17), $$s\Delta v=-sv$$ Eq.(20)

is obtained. Accordingly, by using Eq.(20), Eq.(16) may be modified as follows:

$$d=\{(a_1\omega_o s+\omega_o^2)/(\alpha\beta s^2+a_1\omega_o s+\omega_o^2)\}\cdot\{D-J/(K_t K_{amp})sv\}$$ Eq.(21)

As seen from Eq.(21), the estimated disturbance signal d of Example 4 is equal to the estimated disturbance signal d of Example 3, which is expressed by Eq.(13). Therefore, the control signal c can be compensated by adding the estimated disturbance signal d itself to the control signal c. As a result, the same disturbance suppression effect as in Examples 1 to 3 can be obtained.

Thus, according to Example 4, excellent disturbance suppression is obtained even by using the speed error signal $\Delta v$ instead of the detected speed signal v. Moreover, since the speed error signal $\Delta v$ represents a difference between a desired speed and the detected speed of a motor, the speed error signal $\Delta v$ has a value in the vicinity of zero, indicating the relative smallness of the speed error signal $\Delta v$ as compared with the detected speed signal v. This allows the dynamic range required for the operations of the disturbance torque observer 1 to be set narrow. As a result, when implementing the present invention by using hardware configurations such as analog or digital circuits, the circuit configuration can be simplified. When implementing the present invention by a software servo method, the software process can be simplified. The present invention can be implemented by using a computer including operation registers with a small bit number.

EXAMPLE 5

Next, Example 5 of the present invention will be described. According to Example 5, a period signal indicating a detected period of a frequency signal which is in proportion with the speed of a motor is used instead of a detected speed signal.

Figure 7A:
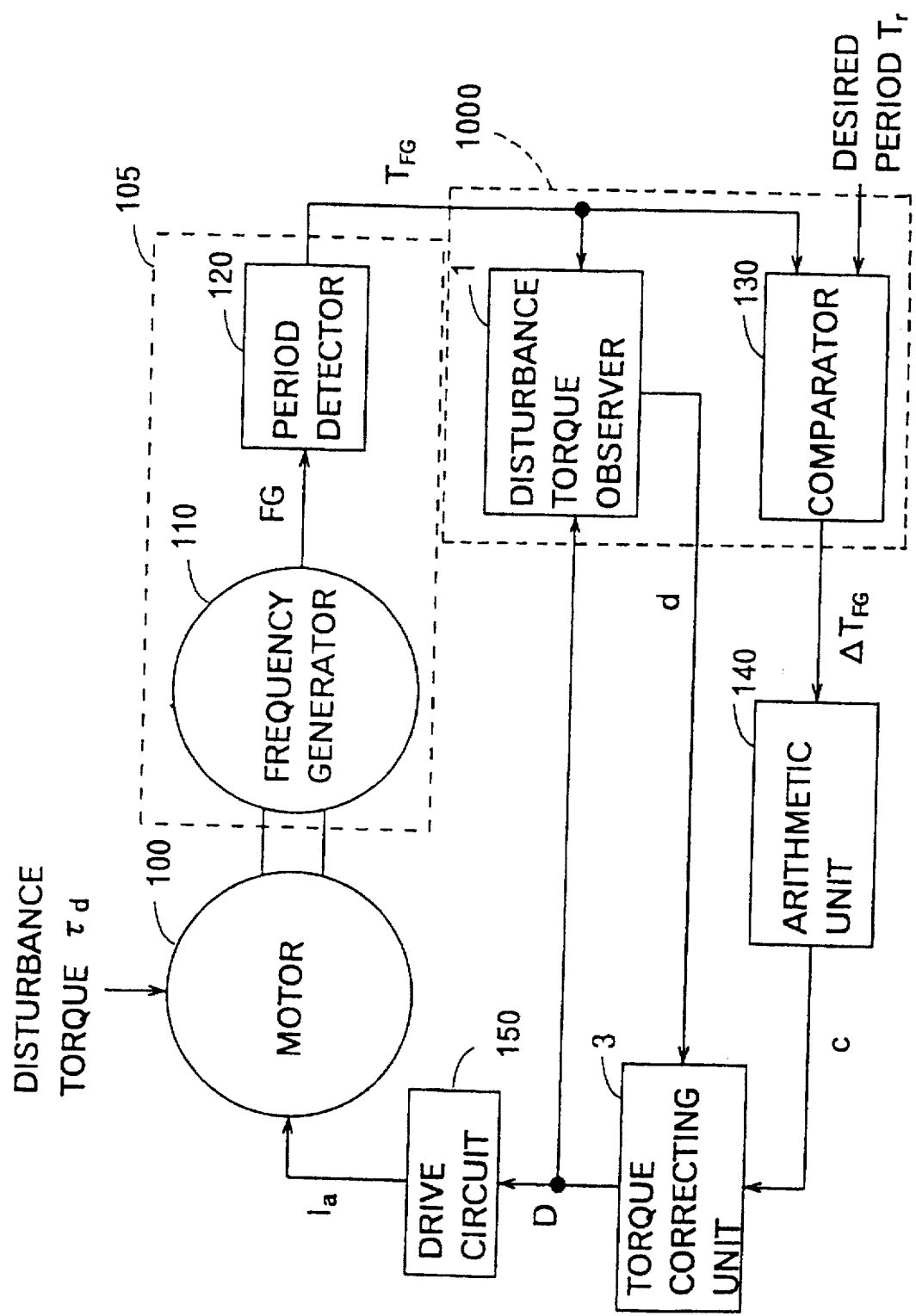
FIG. 7A is a schematic block diagram showing a configuration for a motor speed control apparatus according to Example 5 of the present invention.

FIG. 7A is a block diagram showing the configuration of a motor speed control apparatus according to Example 5 of the present invention.

A disturbance torque $\tau_d$ is applied to a motor 100. A speed detector 105 is attached to the motor 100. The speed detector 105 includes a frequency generator 110 and a period detector 120. The frequency generator 110 outputs a frequency signal FG which is in proportion with the speed of the motor 100. The period detector 120 detects the period of the frequency signal FG so as to output a period signal $T_{FG}$. A comparator 130 outputs a period error signal $\Delta T_{FG}$ based on an offset between the detected period signal $T_{FG}$ and a desired period signal $T_r$ (which is a constant value). An arithmetic unit 140 outputs a control signal c based on the period error signal $\Delta T_{FG}$. A torque correction unit 3 corrects the control signal c by using an estimated disturbance signal d (to be described later), so as to output a drive signal D. The drive circuit 150 supplies a drive current $I_a$ to the motor 100 in accordance with the drive signal D. The disturbance torque observer 1 converts the disturbance torque $\tau_d$ into a value corresponding to the driving signal D based on the period signal $T_{FG}$ and the drive signal D so as to output the estimated disturbance signal d.

The motor speed control apparatus of Example 5 is different from those of Examples 1 to 3 in that the speed detector 105 includes the frequency generator 110 and the period detector 120, and that the period signal $T_{FG}$, the desired period signal $T_r$, and the period error signal $\Delta T_{FG}$ are used in the place of the detected speed signal v, the desired speed signal $v_r$, and the speed error signal $\Delta v$, respectively.

Figure 7B:
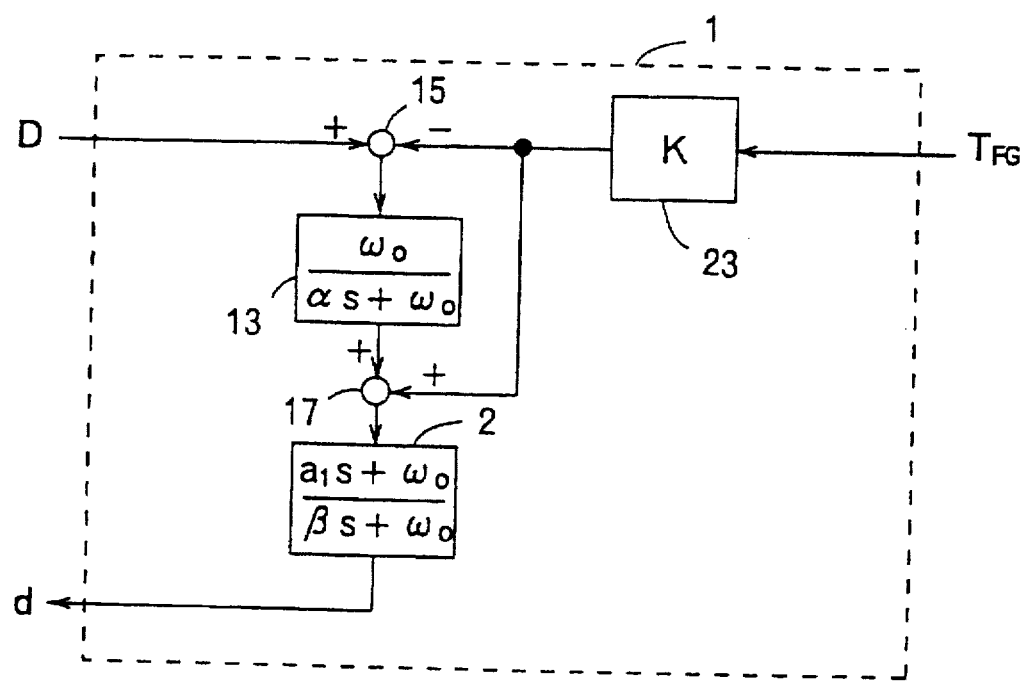
FIG. 7B is a block diagram showing a configuration for a disturbance torque observer according to Example 5 of the present invention.

FIG. 7B is a block diagram showing the configuration of the disturbance torque observer 1 according to Example 5. The configuration of the disturbance torque observer 1 will be described below with reference to FIG. 7B.

The disturbance torque observer 1 includes a multiplier 23, a subtracter 15, a filter 13 having a transfer function $\omega_o/(\alpha s+\omega_o)$, an adder 17, and a filter 2 having a transfer function $(a_1 s+\omega_o)/(\beta s+\omega_o)$, where $\alpha$, $\beta$, $a_1$ and $\omega_o$ represent constants as described in Example 1. The multiplier 23 multiplies the period signal $T_{FG}$ by a predetermined coefficient K, which is expressed as follows:

$$K=(\omega_o/\alpha)\cdot(J_n/K_n)\cdot(1/K_{amp})\cdot(2\pi/Z)\cdot(1/T_r^2)  \quad \text{Eq.(22)}$$

where $J_n$ represents the nominal value of an inertia of the motor 100; $K_m$ represents the nominal value of a torque constant; $K_{amp}$ represents the gain of the drive circuit 150; z represents the number of pulses of the frequency signal FG generated for every rotation of the motor 100; and $\omega_o$ represents a predetermined angular frequency. As described later, the speed fluctuation component due to a disturbance torque component having an angular frequency of $\omega_o$ or less is greatly reduced.

Since the configuration of the torque correction unit 3 is the same as that shown in FIG. 5B, the description thereof is omitted.

Next, an operation of the motor speed control apparatus according to Example 5 will be described. the disturbance torque $\tau_d$ is applied to the motor 100. The frequency generator 110 outputs the frequency signal FG which is in proportion with the speed of the motor 100. The frequency signal FG is input to the period detector 120, the period detector 120 detecting the period of the frequency signal FG so as to output the period signal $T_{FG}$. The period signal $T_{FG}$ may be a signal obtained by converting the frequency of the motor 100 into a voltage in proportion to that frequency. In the comparator 130, the detected period signal $T_{FG}$ is subtracted from the desired period signal $T_r$ (which is a constant value). The result of the substraction is output as the period error signal $\Delta T_{FG}$. The desired period signal $T_r$ is a target value for the rotation frequency of the motor 100. The period error signal $\Delta T_{FG}$ is input to the arithmetic unit 140. The arithmetic unit 140 subjects the period error signal $\Delta T_{FG}$ to a predetermined compensation e.g., proportional or integral compensation, so as to output the result of the compensation as the control signal c. The control signal c is input to the torque correction unit 3 so as to be added with the estimated disturbance signal d. The torque correction unit 3 outputs the result of the addition as the drive signal D. The drive signal D is input to the drive circuit 150, so that the drive current $I_a$, which is in accordance with the drive signal D, is supplied to the motor 100. Thus, the fundamental operation of the speed control loop has been described. As a result of this operation, the motor 100 is driven in such a manner that the detected period signal $T_{FG}$ coincides with the desired period signal $T_r$, thereby stabilizing the speed of the motor 100. The disturbance torque observer 1 receives the period signal $T_{FG}$, which is output from the period detector 120, and the drive signal D, which is output from the torque correction unit 3 and performs an operation (to be described later) so as to output the estimated disturbance signal d. As described above, the estimated disturbance signal d is added to the control signal c output from the arithmetic unit 140.

Next, the operation of disturbance torque observer 1 will be described. The period signal $T_{FG}$, which is output from the period detector 120, is multiplied by a predetermined coefficient K by the multiplier 23. The output of the multiplier 23 is subtracted from the drive signal D, which is output from the torque correction unit 3, in the subtracter 15. The output of the subtracter 15 is subjected to a filtering process expressed by a transfer function $\omega_o/(\alpha s+\omega_o)$ of the filter 13. The processed signal is added to the output of the multiplier 23 in the adder 17. The output of the adder 17 is subjected to a filtering process expressed by a transfer function $(a_1 s+\omega_o)/(\beta s+\omega_o)$ of the filter 2. The filter 2 outputs the processed signal as the estimated disturbance signal d. Thus, the operation of the disturbance torque observer 1 of the present example has been described. The torque correction unit 3 adds the estimated disturbance signal d to the control signal c, which is output from the arithmetic unit 140. As a result, the influence of a disturbance torque $\tau_d$ on the control signal c is cancelled, thereby reducing the speed fluctuation of a motor 100.

Next, the disturbance torque suppression effect according to Example 5 of the present invention will be described by employing equations. It is assumed that an inertia J and a torque constant $K_t$ of the motor 100 are equal to their respective nominal values $J_n$ and $K_m$, and will be indicated as J and $K_t$.

As seen from the block diagram of the disturbance torque observer 1 shown in FIG. 7B, the estimated disturbance signal d is expressed as follows by using the period signal $T_{FG}$ and the drive signal D:

$$\begin{aligned}
d &= [\{\omega_o/(\alpha s+\omega_o)\}\cdot(D-KT_{FG})+KT_{FG}]\cdot \quad \text{Eq.(23)}\\
&\quad \{(a_1 s+\omega_o)/(\beta s+\omega_o)\}\\
&= \{\omega_o/(\alpha s+\omega_o)\}\cdot\{(a_1 s+\omega_o)/(\beta s+\omega_o)\}\cdot\\
&\quad \{D+(J/K_t)\cdot(1/K_{amp})\cdot(2\pi/Z)\cdot(1/T_r^2)sT_{FG}\}\\
&= [(a_1\omega_o s+\omega_o^2)/\{\alpha\beta s^2+(\alpha+\beta)\omega_o s+\omega_o^2\}]\cdot\\
&\quad \{D+(J/K_t)\cdot(1/K_{amp})\cdot(2\pi/Z)\cdot(1/T_r^2)sT_{FG}\}
\end{aligned}$$

Eq.(23) is expressed as follows, in accordance with Eq. (1):

$$d = \{(a_1\omega_o s+\omega_o^2)/(\alpha\beta s^2+a_1\omega_o s+\omega_o^2)\}\cdot \quad \text{Eq.(24)}$$
$$\{D+(J/K_t)\cdot(1/K_{amp})\cdot(2\pi/Z)\cdot(1/T_r^2)sT_{FG}\}$$

By assuming u(t) to be a function of the period error signal $T_{FG}$ in the time domain, and y(t) to be a function of the detected speed signal v in the time domain, that is, $$T_{FG}=L\{u(t)\}, v=L\{y(t)\} \quad \text{Eq.(25)}$$

where L represents Laplacian transform, the following relationship holds:

$$y(t)=(2\pi/Z)\cdot(1/u(t))\cdot \quad \text{Eq.(26)}$$

Since the motor 100 is controlled so as to rotate at a constant speed, the period signal u(t) varies in the vicinity of the desired period signal $T_r$ (which is a constant value). Therefore, the time-differentiated value of the angular speed y(t) and the time-differentiated value of the period signal u(t) satisfy the following relationship:

$$dy/dt=-(2\pi/Z)\cdot(1/T_r^2)du/dt\cdot \quad \text{Eq.(27)}$$

By subjecting both sides of Eq.(27) to Laplacian transform in accordance with Eq.(25), $$sv=-(2\pi/Z)\cdot(1/T_r^2)sT_{FG} \quad \text{Eq.(28)}$$

is obtained. Accordingly, by using Eq.(28), Eq.(24) may be modified as follows:

$$d=\{(a_1\omega_o s+\omega_o^2)/(\alpha\beta s^2 a_1\omega_o s+\omega_o^2)\}\cdot(D-J/(K_tK_{amp})sv) \quad \text{Eq.(29)}$$

As seen from Eq.(29), the estimated disturbance signal d of Example 5 is equal to the estimated disturbance signal d of Example 3, which is expressed by Eq.(13). Therefore, the control signal c can be compensated by adding the estimated disturbance signal d itself to the control signal c. As a result, the same disturbance suppression effect as in Examples 1 to 4 can be obtained.

Thus, according to Example 5, the same excellent disturbance suppression as in the case where the disturbance torque $\tau_d$ is converted into a value corresponding to the angular speed of the motor 100 is obtained. According to Example 5, the speed fluctuation due to disturbance torques at low frequencies is particularly greatly reduced.

Thus, according to Example 5, the estimation of the disturbance torque is achieved without converting the period signal into a value corresponding to the angular speed of the motor 100.

Moreover, Example 5 can be easily applied to a motor speed control apparatus of a period feedback type where a detected period of a frequency signal output from a frequency generator is controlled so as to have no error with respect to a desired period.

EXAMPLE 6

Next, Example 6 of the present invention will be described. According to Example 6, a period error signal is used instead of a detected period signal.

Figure 8A:
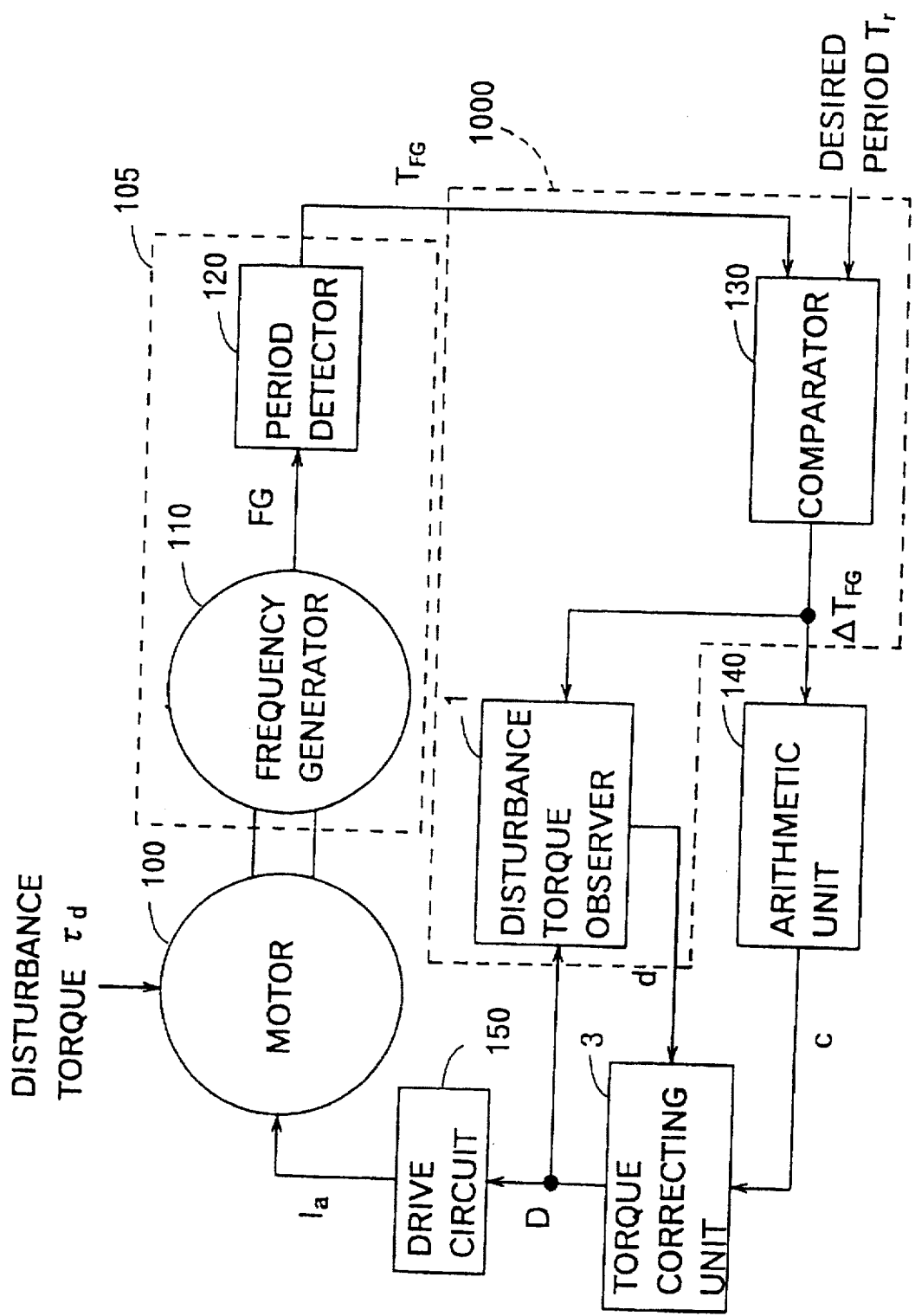
FIG. 8A is a schematic block diagram showing a configuration for a motor speed control apparatus according to Example 6 of the present invention.

FIG. 8A is a block diagram showing the configuration of a motor speed control apparatus according to Example 6 of the present invention. The configuration of the disturbance torque observer 1 of Example 6 is the same as that of the disturbance torque observer 1 of Example 5 except that the period error signal $\Delta T_{FG}$ is input thereto instead of the period signal $T_{FG}$. Since the other constituent elements are identical with those employed in Example 5, they are indicated by the same reference numerals as used therein, and the descriptions thereof are omitted.

Figure 8B:
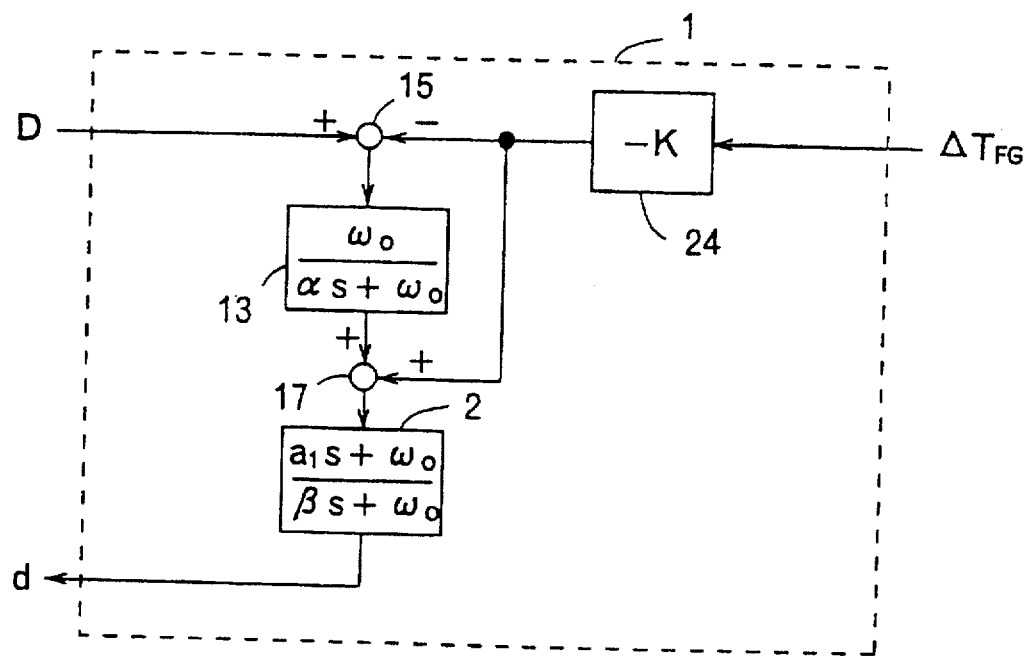
FIG. 8B is a block diagram showing a configuration for a disturbance torque observer according to Example 6 of the present invention.

FIG. 8B is a block diagram showing the configuration of the disturbance torque observer 1 according to Example 6. The configuration of the disturbance torque observer 1 of the present example is the same as that of the disturbance torque observer 1 of Example 5 (shown in FIG. 7B) except for the multiplier 23. A multiplier 24 of the disturbance torque observer 1 of Example 6 multiplies an input signal by a coefficient −K having a different sign from that of the coefficient K by which the multiplier 23 of the disturbance torque observer 1 of Example 5 multiplies an input signal $T_{FG}$.

The torque correction unit 3 has the same configuration as that of the torque correction unit 3 of Example 3 (shown in FIG. 5B).

Next, the operation of the disturbance torque observer 1 according to Example 6 will be described. Since the operations of the other constituent elements of the motor speed control apparatus of Example 6 are the same as in Example 5, the descriptions thereof are omitted.

The period error signal $\Delta T_{FG}$, which is output from a comparator 130, is multiplied by a predetermined coefficient −K by a multiplier 24, where K is a constant expressed by Eq.(22). The output of the multiplier 24 is subtracted from a drive signal D, which is output from a torque correction unit 3. The output of the subtracter 15 is subjected to a filtering process expressed by a transfer function $\omega_o/(\alpha s+\omega_o)$ of a filter 13. The processed signal is added to the output of the multiplier 24 in an adder 17. The output of the adder 17 is subjected to a filtering process expressed by a transfer function $(a_1 s+\omega_o)/(\beta s+\omega_o)$ of a filter 2. The filter 2 outputs the processed signal as an estimated disturbance signal d. Thus, the operation of the disturbance torque observer 1 of the present example has been described. The torque correction unit 3 adds the estimated disturbance signal d to a control signal c, which is output from an arithmetic unit 140. As a result, the influence of a disturbance torque $\tau_d$ on the control signal c is cancelled, thereby reducing the speed fluctuation of a motor 100.

Next, the disturbance torque suppression effect according to Example 6 of the present invention will be described by employing equations. It is assumed that an inertia J and a torque constant $K_t$ of the motor 100 are equal to their respective nominal values $J_n$ and $K_{tn}$, and will be indicated as J and $K_t$.

As seen from the block diagram of the disturbance torque observer 1 shown in FIG. 8B, the estimated disturbance signal d is expressed as follows by using the period signal $\Delta T_{FG}$ and the drive signal D:

$$\begin{aligned} d &= [\{\omega_o/(\alpha s+\omega_o)\}\cdot(D+K\Delta T_{FG})-K\Delta T_{FG}]\cdot \quad \text{Eq.(30)}\\ &\quad \{(a_1 s+\omega_o)/(\beta s+\omega_o)\} \\ &= \{\omega_o/(\alpha s+\omega_o)\}\cdot\{(a_1 s+\omega_o)/(\beta s+\omega_o)\}\cdot \\ &\quad \{D-(J/K_t)\cdot(1/K_{amp})\cdot(2\pi/Z)\cdot(1/T_r^2)s\Delta T_{FG}\} \\ &= [(a_1\omega_o s+\omega_o^2)/\{\alpha\beta s^2+(\alpha+\beta)\omega_o s+\omega_o^2\}]\cdot \\ &\quad \{D-(J/K_t)\cdot(1/K_{amp})\cdot(2\pi/Z)\cdot(1/T_r^2)s\Delta T_{FG}\} \end{aligned}$$

Eq.(30) is expressed as follows, in accordance with Eq. (1):

$$d=\{(a_1\omega_o s+\omega_o^2)/(\alpha\beta s^2+a_1\omega_o s+\omega_o^2)\}\cdot \quad \text{Eq.(31)}$$
$$\{D-(J/K_t)\cdot(1/K_{amp})\cdot(2\pi/Z)\cdot(1/T_r^2)s\Delta T_{FG}\}$$

By assuming u(t) to be a function of the period error signal $T_{FG}$ in the time domain, and w(t) to be a function of the period error signal $\Delta T_{FG}$ in the time domain, that is, $$T_{FG}=L\{u(t)\}, \Delta T_{FG}=L\{w(t)\} \quad \text{Eq.(32)}$$

where L represents Laplacian transform, the following relationship holds:

$$w(t)=T_r-u(t) \quad \text{Eq.(33)}$$

Since the desired period signal $T_r$ is a constant value, both sides of Eq.(33) are subjected to differentiation by time to give the following:

$$dw/dt=-du/dt \quad \text{Eq.(34)}$$

By subjecting both sides of Eq.(34) to Laplacian transform in accordance with Eq.(32), $$s\Delta T_{FG}=-sT_{FG} \quad \text{Eq.(35)}$$

is obtained. Accordingly, by using Eq.(28), Eq.(35) may be modified as follows:

$$sv=(2\pi/Z)\cdot(1/T_r^2)s\Delta T_{FG} \quad \text{Eq.(36)}$$

Thus, by using Eq.(36), Eq.(31) may be modified as follows:

$$d=\{(a_1\omega_o s+\omega_o^2)/(\alpha\beta s^2+a_1\omega_o s+\omega_o^2)\}\cdot\{D-J/(K_tK_{amp})sv\} \quad \text{Eq.(37)}$$

As seen from Eq.(37), the estimated disturbance signal d of Example 6 is equal to the estimated disturbance signal d of Example 3, which is expressed by Eq.(13). Therefore, the control signal c can be compensated by adding the estimated disturbance signal d itself to the control signal c. As a result, the same disturbance suppression effect as in Examples 1 to 5 can be obtained.

Thus, according to Example 6, the disturbance torque can be estimated by using the period error signal $\Delta T_{FG}$ instead of the period signal $T_r$. Moreover, Example 6 can be easily applied to a motor speed control apparatus of a period feedback type where a detected period of a frequency signal output from a frequency generator is controlled so as to have no error with respect to a desired period. As described in Example 4, the period error signal $\Delta T_{FG}$ is relatively small as compared with the period signal $T_r$, so that the dynamic range required for the operations of the disturbance torque observer 1 can be set narrow. As a result, when implementing the present invention by using hardware configurations such as analog or digital circuits, the circuit configuration can be simplified. When implementing the present invention by a software servo method, the software process can be simplified.

As the signal to be input to the disturbance torque observer 1, any signal that substantially corresponds to one of those signals described in the above examples can be used. For example, similar disturbance suppression effects can be obtained by employing a drive current supplied to the motor instead of the drive signal D.

Although Example 1 was described with respect to a case where the disturbance torque observer 1 outputs the estimated disturbance signal d having a dimension inherent to torques, similar effects can be attained also by, instead of substantially performing a multiplication in the multipliers 10 and 31, prescribing the multiplication coefficient in the multiplier 11 to be $J_n/(K_t K_{amp})$. In this case, the estimated disturbance signal d output from the disturbance torque observer 1 has a value obtained by converting the disturbance torque into a value corresponding to the drive signal. As a result, the configuration of the disturbance suppression loop can be simplified.

Although the detected speed signal v was input to the disturbance torque observer 1 in Example 1, it is applicable to employ the speed error signal $\Delta v$, instead of the detected speed signal v, by changing the sign of the coefficient by which the multiplier 11 multiplies an input signal.

Similarly, in Example 2, it is applicable to employ the speed error signal $\Delta v$, instead of the detected speed signal v, by changing the sign of the coefficient by which the multiplier 20 multiplies an input signal. Although the effect resulting from prescribing the values of $a_1$ and $\alpha\beta$ to be 4 was only described in Example 1, the same effect can be attained in Examples 2 to 6 as well. Furthermore, although the disturbance torque observer 1 was described to output an estimated disturbance signal having a dimension inherent to the drive signal D in Examples 5 and 6, it is easy to modify the disturbance torque observer 1 to output an estimated disturbance signal having a dimension inherent to torques.

Although a configuration was described in which the disturbance torque observer 1 does not include a differentiator, the present invention easily accepts a configuration incorporating a differentiator as described in Example 1.

In any of Examples 1 to 6 of the present invention, it is applicable to incorporate a comparison estimator 1000 that includes the disturbance torque observer 1 and the comparator 130. Such an embodiment will similarly attain the above-described effects of the present invention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A motor speed control apparatus comprising:

comparison estimation means for receiving a first signal indicating a detected rotation of a motor and a target signal indicating a desired rotation value of the motor, the comparison estimation means outputting an error signal in accordance with a difference between the first signal and the target signal and outputting an estimated disturbance signal indicating a degree of disturbance torque applied to the rotation of the motor;

control means for receiving the error signal and outputting a control signal in accordance with the error signal;

correction means for receiving the control signal and the estimated disturbance signal and correcting the control signal based on the estimated disturbance signal so as to reduce influence of the disturbance torque on the control signal, the correction means outputting the corrected control signal as a drive signal; and driving means for receiving the drive signal and supplying the motor with electric power in accordance with the drive signal, wherein the comparison estimation means comprises a second-order low pass filter and outputs the estimated disturbance signal through the second-order low pass filter, wherein the comparison estimation means further comprises:

first means for multiplying the drive signal by a predetermined first coefficient; and second means for receiving either the first signal or the error signal, and processing the received signal based on a predetermined first transfer function, and wherein the second-order low pass filter comprises:

a first filter for receiving output signals from the first means and the second means, and filtering the received signals based on a predetermined second transfer function; and a second filter for receiving an output from the first filter and filtering the received signal based on a first-order phase-advancing transfer function so as to output the estimated disturbance signal.

2. A motor speed control apparatus according to claim 1, wherein the first filter performs a filtering process for the received signals based on a transfer function $\omega_o/(\alpha s+\omega_o)$, and the second filter performs a filtering process for the received signal based on a transfer function $(a_1 s+\omega_o)/(\beta s+\omega_o)$, wherein s represents a Laplacian; $\omega_o$ represents an angular frequency; $\alpha$ represents a predetermined constant; and $\beta$ represents a predetermined constant.

3. A motor speed control apparatus according to claim 2, wherein the second filter further receives an output signal from the second means.

4. A motor speed control apparatus according to claim 1, wherein the first filter performs a filtering process for the received signals based on a transfer function $\omega_o/(\alpha s+\omega_o)$, and the second filter performs a filtering process for the received signal based on a transfer function $(a_1 s+\omega_o)/(\beta s+\omega_o)$, wherein s represents a Laplacian; $\omega_o$ represents an angular frequency; $\alpha$ represents a predetermined constant; and $\beta$ represents a predetermined constant, wherein the second filter further receives an output signal from the second means, and wherein the coefficient of the first means is 1.

5. A motor speed control apparatus according to claim 2, wherein the first signal is a rotation speed signal indicating a rotation speed of the motor, and the target signal is a target rotation speed signal indicating a target rotation speed of the motor.

6. A motor speed control apparatus according to claim 3, wherein the first signal is a rotation speed signal indicating a rotation speed of the motor, and the target signal is a target rotation speed signal indicating a target rotation speed of the motor.

7. A motor speed control apparatus according to claim 4, wherein the first signal is a rotation speed signal indicating a rotation speed of the motor, and the target signal is a target rotation speed signal indicating a target rotation speed of the motor.

8. A motor speed control apparatus according to claim 4, wherein the first signal is a period signal indicating a rotation period of the motor, and the target signal is a target period signal indicating a target rotation period of the motor.

9. A motor speed control apparatus according to claim 1, wherein the second-order low pass filter has a transfer function defined as $\{1+a_1(s/\omega_o)\}/\{1+a_1(s/\omega_o)+a_2^2(s/\omega_o)^2\}$, wherein s represents a Laplacian; $\omega_o$ represents an angular frequency; $a_1$ represents a predetermined constant.

10. A motor speed control apparatus according to claim 9, wherein $a_1$ and $a_2$ satisfy the relationship $a_1 \geq 2a_2$.

11. A motor speed control apparatus according to claim 9, wherein $a_1=4$ and $a_2=2$.

12. A motor speed control apparatus according to claim 2, wherein the correction means comprises multiplication means for multiplying the estimated disturbance signal by a predetermined coefficient and addition means for summing the control signal and an output of the multiplication means so as to output a result of the addition as the drive signal.

13. A motor speed control apparatus according to claim 4, wherein the correction means comprises addition means for summing the control signal and the estimated disturbance signal so as to output a result of the addition as the drive signal.

14. A motor speed control apparatus according to claim 2, wherein the coefficient $\alpha$ of the first filter, the coefficient $\beta$ of the second filter, and the constant $a_1$ satisfy the relationship $\alpha+\beta=a_1$.

15. A motor speed control apparatus according to claim 2, wherein the coefficient $\alpha$ of the first filter, the coefficient $\beta$ of the second filter, and the constant $a_1$ satisfy the relationships $\alpha=\beta=2$ and $a_1=4$.

16. A motor speed control apparatus according to claim 1, wherein the predetermined first transfer function comprises a predetermined coefficient.

* * * * *